(12) United States Patent
Loheide et al.

(10) Patent No.: US 11,431,778 B2
(45) Date of Patent: Aug. 30, 2022

(54) DYNAMIC PLAYOUT BUFFER FOR DISPARATE LIVE MEDIA OUTPUT STREAM

(71) Applicant: Turner Broadcasting System, Inc., Atlanta, GA (US)

(72) Inventors: Donald Jude Loheide, Mableton, GA (US); Nishith Kumar Sinha, Mableton, GA (US); Nicolas Paul Webb, McDonough, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 17/017,145

(22) Filed: Sep. 10, 2020

(65) Prior Publication Data

US 2020/0412786 A1 Dec. 31, 2020

Related U.S. Application Data

(63) Continuation-in-part of application No. 16/234,870, filed on Dec. 28, 2018, now Pat. No. 10,965,967, (Continued)

(51) Int. Cl.
*H04L 65/65* (2022.01)
*H04N 21/234* (2011.01)
(Continued)

(52) U.S. Cl.
CPC .......... *H04L 65/608* (2013.01); *H04L 65/607* (2013.01); *H04N 21/2187* (2013.01); *H04N 21/23406* (2013.01)

(58) Field of Classification Search
CPC . H04L 65/608; H04L 65/607; H04N 21/2187; H04N 21/23406
See application file for complete search history.

(56) References Cited

U.S. PATENT DOCUMENTS

| 8,553,853 B2 | 10/2013 | Middleswarth et al. |
| 8,600,382 B2 | 12/2013 | Hicks, III |

(Continued)

OTHER PUBLICATIONS

Corrected Notice of Allowance for U.S. Appl. No. 16/234,870 dated Feb. 24, 2021.

(Continued)

*Primary Examiner* — Chenea Davis
(74) *Attorney, Agent, or Firm* — Chip Law Group

(57) ABSTRACT

A system is provided for publishing first programming schedule that references at least one or more pre-encoded media assets and/or one or more live input streams, and comprises one or more playout buffer features enabled via one or more constraints and rights. Each playout buffer feature of the one or more playout buffer features is associated with corresponding number of media segments that represents the one or more pre-encoded media assets and/or one or more live input streams. A request is received that comprises at least a stream identifier and at least an additional parameter. In accordance with a playout buffer feature from the one or more playout buffer features and at least the additional parameter, manifest data and indexed metadata of one or more media segments associated with stream identifier is inserted to first disparate live media output stream manifest and first disparate live media output stream is generated.

37 Claims, 11 Drawing Sheets

Related U.S. Application Data which is a continuation-in-part of application No. 15/396,475, filed on Dec. 31, 2016, now Pat. No. 11,134,309.

(60) Provisional application No. 62/898,582, filed on Sep. 11, 2019, provisional application No. 62/699,131, filed on Jul. 17, 2018.

(51) Int. Cl.
    *H04N 21/2187* (2011.01)
    *H04L 65/60* (2022.01)

(56) References Cited

U.S. PATENT DOCUMENTS

| | | | |
|---|---|---|---|
| 8,954,521 | B1 | 2/2015 | Faaborg et al. |
| 9,380,264 | B1 | 6/2016 | Vakalapudi |
| 2003/0110507 | A1 | 6/2003 | Dimitrova et al. |
| 2003/0236832 | A1 | 12/2003 | McIntyre et al. |
| 2004/0172650 | A1 | 9/2004 | Hawkins et al. |
| 2004/0172662 | A1 | 9/2004 | Danker et al. |
| 2005/0015816 | A1 | 1/2005 | Christofalo et al. |
| 2006/0287915 | A1 | 12/2006 | Boulet et al. |
| 2007/0186228 | A1 | 8/2007 | Ramaswamy et al. |
| 2009/0285217 | A1 | 11/2009 | Frink et al. |
| 2009/0287790 | A1 | 11/2009 | Upton et al. |
| 2010/0010899 | A1 | 1/2010 | Lambert et al. |
| 2010/0287297 | A1 | 11/2010 | Lefebvre |
| 2011/0123062 | A1 | 5/2011 | Hilu |
| 2011/0153464 | A1 | 6/2011 | Hendricks et al. |
| 2011/0177775 | A1 | 7/2011 | Gupta et al. |
| 2011/0209181 | A1 | 8/2011 | Gupta et al. |
| 2011/0246202 | A1 | 10/2011 | McMillan et al. |
| 2012/0271942 | A1 | 10/2012 | Walker et al. |
| 2013/0205212 | A1 | 8/2013 | Sinha et al. |
| 2013/0276023 | A1 | 10/2013 | Kent et al. |
| 2014/0152894 | A1 | 6/2014 | Childs et al. |
| 2014/0186001 | A1 | 7/2014 | Aldrey et al. |
| 2014/0189514 | A1 | 7/2014 | Hilliard |
| 2014/0359656 | A1 | 12/2014 | Banica et al. |
| 2015/0074732 | A1 | 3/2015 | Green et al. |
| 2015/0289022 | A1 | 10/2015 | Gross |
| 2015/0381936 | A1 | 12/2015 | Goyal et al. |
| 2016/0105477 | A1 | 4/2016 | Holden et al. |
| 2016/0127788 | A1 | 5/2016 | Roberts et al. |
| 2016/0142783 | A1 | 5/2016 | Bagga et al. |
| 2016/0150290 | A1 | 5/2016 | Chandler et al. |
| 2016/0316247 | A1 | 10/2016 | Biagini et al. |
| 2017/0099506 | A1 | 4/2017 | Grover |
| 2017/0164019 | A1* | 6/2017 | Oh .................. H04N 21/6587 |
| 2017/0195718 | A1 | 7/2017 | Nair et al. |
| 2017/0257446 | A1 | 9/2017 | Bevilacqua et al. |
| 2017/0289597 | A1* | 10/2017 | Riedel .............. H04N 21/25875 |
| 2018/0165650 | A1 | 6/2018 | Kashyape et al. |
| 2018/0184047 | A1 | 6/2018 | Simonsen et al. |
| 2018/0343505 | A1 | 11/2018 | Loheide et al. |
| 2018/0367823 | A1 | 12/2018 | Brinkley et al. |
| 2020/0059308 | A1* | 2/2020 | Cox ................... H04H 20/55 |
| 2020/0244778 | A1 | 7/2020 | Berookhim et al. |

OTHER PUBLICATIONS

Corrected Notice of Allowance for U.S. Appl. No. 16/234,870 dated Jan. 15, 2021.
Final Office Action for U.S. Appl. No. 15/396,468 dated Feb. 10, 2021.
Final Office Action for U.S. Appl. No. 15/988,308 dated Jan. 28, 2021.
Final Office Action for U.S. Appl. No. 15/988,492 dated Jan. 6, 2021.
Non-Final Office Action for U.S. Appl. No. 16/854,970 dated Mar. 17, 2021.
Notice of Allowance for U.S. Appl. No. 15/396,475 dated Feb. 5, 2021.
Notice of Allowance for U.S. Appl. No. 15/986,406 dated Mar. 3, 2021.
Notice of Allowance for U.S. Appl. No. 16/229,310 dated Dec. 14, 2020.
Notice of Allowance for U.S. Appl. No. 16/229,497 dated Dec. 30, 2020.
Notice of Allowance for U.S. Appl. No. 16/229,614 dated Feb. 18, 2021.
Notice of Allowance for U.S. Appl. No. 16/230,493 dated Feb. 12, 2021.
Notice of Allowance for U.S. Appl. No. 16/902,775 dated Feb. 2, 2021.
Supplemental Notice of Allowance for U.S. Appl. No. 15/986,218 dated Jan. 27, 2021.
Corrected Notice of Allowance for U.S. Appl. No. 16/235,445 dated Mar. 26, 2021.
Corrected Notice of Allowability for U.S. Appl. No. 16/230,493 dated Jul. 8, 2021.
Corrected Notice of Allowance for U.S. Appl. No. 16/902,775 dated Jul. 30, 2021.
Corrected Notice of Allowance for U.S. Appl. No. 15/396,475 dated Aug. 24, 2021.
Corrected Notice of Allowance for U.S. Appl. No. 15/396,475 dated Jul. 12, 2021.
Corrected Notice of Allowance for U.S. Appl. No. 15/986,406 dated Jul. 16, 2021.
Corrected Notice of Allowance for U.S. Appl. No. 15/986,451 dated Aug. 11, 2021.
Final Office Action for U.S. Appl. No. 16/854,970 dated Aug. 18, 2021.
Non-Final Office Action for U.S. Appl. No. 16/918,085 dated Aug. 19, 2021.
Non-Final Office Action for U.S. Appl. No. 15/988,572 dated Aug. 25, 2021.
Non-Final Office Action for U.S. Appl. No. 16/985,444 dated Sep. 3, 2021.
Non-Final Office Action for U.S. Appl. No. 17/094,102 dated Sep. 20, 2021.
Notice of Allowance for U.S. Appl. No. 15/988,308 dated Jul. 30, 2021.
Notice of Allowance for U.S. Appl. No. 15/988,492 dated Jul. 30, 2021.
Corrected Notice of Allowance for U.S. Appl. No. 15/986,286 dated May 27, 2021.
Corrected Notice of Allowance for U.S. Appl. No. 16/229,310 dated Apr. 27, 2021.
Corrected Notice of Allowance for U.S. Appl. No. 16/229,310 dated Jun. 3, 2021.
Corrected Notice of Allowance for U.S. Appl. No. 16/229,497 dated Jun. 3, 2021.
Corrected Notice of Allowance for U.S. Appl. No. 16/229,614 dated Jun. 29, 2021.
Corrected Notice of Allowance for U.S. Appl. No. 16/236,713 dated Apr. 8, 2021.
Corrected Notice of Allowance for U.S. Appl. No. 16/236,713 dated May 17, 2021.
Corrected Notice of Allowance for U.S. Appl. No. 16/902,775 dated Apr. 26, 2021.
Corrected Notice of Allowance for U.S. Appl. No. 16/902,775 dated Apr. 9, 2021.
Corrected Notice of Allowance for U.S. Appl. No. 16/902,775 dated Jun. 11, 2021.
Final Office Action for U.S. Appl. No. 15/988,572 dated May 12, 2021.
Non-Final Office Action for U.S. Appl. No. 15/396,468 dated Jun. 1, 2021.
Non-Final Office Action for U.S. Appl. No. 15/988,492 dated Apr. 14, 2021.
Non-Final Office Action for U.S. Appl. No. 17/038,323 dated Jul. 1, 2021.

(56) References Cited

OTHER PUBLICATIONS

Notice of Allowance for U.S. Appl. No. 15/986,451 dated May 5, 2021.
Supplemental Notice of Allowance for U.S. Appl. No. 15/986,406 dated Apr. 7, 2021.
Supplemental Notice of Allowance for U.S. Appl. No. 15/986,406 dated Jun. 9, 2021.
Corrected Notice of Allowance for U.S. Appl. No. 15/988,241 dated Nov. 18, 2020.
Corrected Notice of Allowance for U.S. Appl. No. 16/230,268 dated Dec. 2, 2020.
Corrected Notice of Allowance for U.S. Appl. No. 16/230,268 dated Oct. 9, 2020.
Corrected Notice of Allowance for U.S. Appl. No. 16/231,467 dated Nov. 20, 2020.
Corrected Notice of Allowance for U.S. Appl. No. 16/231,467 dated Oct. 1, 2020.
Corrected Notice of Allowance for U.S. Appl. No. 16/236,673 dated Oct. 23, 2020.
Corrected Notice of Allowance for U.S. Appl. No. 16/236,673 dated Sep. 21, 2020.
Final Office Action for U.S. Appl. No. 15/986,451 dated Sep. 29, 2020.
Final Office Action for U.S. Appl. No. 16/236,713 dated Sep. 30, 2020.
Non-Final Office Action for U.S. Appl. No. 15/986,406 dated Oct. 30, 2020.
Non-Final Office Action for U.S. Appl. No. 15/988,572 dated Nov. 6, 2020.
Non-Final Office Action for U.S. Appl. No. 16/902,775 dated Oct. 5, 2020.
Notice of Allowability for U.S. Appl. No. 15/986,361 dated Sep. 30, 2020.
Notice of Allowance for U.S. Appl. No. 16/235,445 dated Nov. 4, 2020.
Notice of Allowance for U.S. Appl. No. 16/236,713 dated Nov. 18, 2020.
Corrected Notice of Allowance for U.S. Appl. No. 15/986,451 dated Jan. 5, 2022.
Corrected Notice of Allowance for U.S. Appl. No. 15/986,451 dated Nov. 16, 2021.
Corrected Notice of Allowance for U.S. Appl. No. 15/988,308 dated Dec. 22, 2021.
Corrected Notice of Allowance for U.S. Appl. No. 15/988,308 dated Oct. 20, 2021.
Corrected Notice of Allowance for U.S. Appl. No. 15/988,492 dated Dec. 3, 2021.
Corrected Notice of Allowance for U.S. Appl. No. 15/988,492 dated Oct. 20, 2021.
Corrected Notice of Allowance for U.S. Appl. No. 17/326,258 dated Dec. 22, 2021.
Final Office Action for U.S. Appl. No. 15/396,468 dated Dec. 2, 2021.
Final Office Action for U.S. Appl. No. 16/918,085 dated Dec. 8, 2021.
Final Office Action for U.S. Appl. No. 17/038,323 dated Nov. 1, 2021.
Non-Final Office Action for U.S. Appl. No. 17/017,052 dated Dec. 27, 2021.
Non-Final Office Action for U.S. Appl. No. 17/017,241 dated Dec. 20, 2021.
Non-Final Office Action for U.S. Appl. No. 17/094,319 dated Dec. 8, 2021.
Non-Final Office Action for U.S. Appl. No. 17/147,887 dated Dec. 22, 2021.
Non-Final Office Acton for U.S. Appl. No. 17/016,789 dated Dec. 21, 2021.
Notice of Allowance for U.S. Appl. No. 16/985,444 dated Jan. 10, 2022.
Notice of Allowance for U.S. Appl. No. 17/038,323 dated Jan. 12, 2022.
Notice of Allowance for U.S. Appl. No. 17/094,102 dated Jan. 14, 2022.
Notice of Allowance for U.S. Appl. No. 17/326,258 dated Nov. 17, 2021.
Supplemental Notice of Allowance for U.S. Appl. No. 15/988,492 dated Nov. 9, 2021.
Corrected Notice of Allowance for U.S. Appl. No. 15/396,468 dated Apr. 1, 2022.
Corrected Notice of Allowance for U.S. Appl. No. 15/988,308 dated Jan. 24, 2022.
Corrected Notice of Allowance for U.S. Appl. No. 15/988,308 dated Mar. 2, 2022.
Corrected Notice of Allowance for U.S. Appl. No. 16/985,444 dated Apr. 20, 2022.
Corrected Notice of Allowance for U.S. Appl. No. 16/985,444 dated Mar. 25, 2022.
Corrected Notice of Allowance for U.S. Appl. No. 17/038,323 dated Apr. 19, 2022.
Corrected Notice of Allowance for U.S. Appl. No. 17/038,323 dated Feb. 2, 2022.
Corrected Notice of Allowance for U.S. Appl. No. 17/094,102 dated Apr. 20, 2022.
Corrected Notice of Allowance for U.S. Appl. No. 17/094,102 dated Mar. 10, 2022.
Corrected Notice of Allowance for U.S. Appl. No. 17/326,258 dated Apr. 19, 2022.
Corrected Notice of Allowance for U.S. Appl. No. 17/326,258 dated Feb. 25, 2022.
Corrected Notice of Allowance for U.S. Appl. No. 17/326,258 dated Mar. 14, 2022.
Corrected Notice of Allowance for U.S. Appl. No. 17/326,258 dated Mar. 2, 2022.
Final Office Action for U.S. Appl. No. 15/988,572 dated Mar. 10, 2022.
Non-Final Office Action for U.S. Appl. No. 16/854,970 dated Feb. 17, 2022.
Non-Final Office Action for U.S. Appl. No. 16/918,085 dated Mar. 31, 2022.
Notice of Allowance for U.S. Appl. No. 15/396,468 dated Mar. 18, 2022.
Notice of Allowance for U.S. Appl. No. 16/895,439 dated Mar. 1, 2022.
Notice of Allowance for U.S. Appl. No. 16/902,893 dated Feb. 25, 2022.
Notice of Allowance for U.S. Appl. No. 17/016,789 dated Feb. 11, 2022.
Notice of Allowance for U.S. Appl. No. 17/017,052 dated Feb. 11, 2022.
Notice of Allowance for U.S. Appl. No. 17/094,319 dated Apr. 12, 2022.
Notice of Allowance for U.S. Appl. No. 17/147,887 dated Apr. 19, 2022.
Notice of Allowance for U.S. Appl. No. 17/340,166 dated Mar. 21, 2022.
Final Office Action for U.S. Appl. No. 17/017,241 dated Apr. 28, 2022.
Notice of Allowance for U.S. Appl. No. 17/326,258 dated Apr. 27, 2022.
Corrected Notice of Allowance for U.S. Appl. No. 15/396,468 dated Jun. 24, 2022.
Corrected Notice of Allowance for U.S. Appl. No. 16/985,444 dated Jun. 1, 2022.
Corrected Notice of Allowance for U.S. Appl. No. 17/016,789 dated Jun. 27, 2022.
Corrected Notice of Allowance for U.S. Appl. No. 17/016,789 dated May 18, 2022.
Corrected Notice of Allowance for U.S. Appl. No. 17/017,052 dated Jun. 15, 2022.
Corrected Notice of Allowance for U.S. Appl. No. 17/038,323 dated May 26, 2022.

(56) References Cited

OTHER PUBLICATIONS

Corrected Notice of Allowance for U.S. Appl. No. 17/094,102 dated Jun. 24, 2022.
Corrected Notice of Allowance for U.S. Appl. No. 17/094,102 dated May 17, 2022.
Corrected Notice of Allowance for U.S. Appl. No. 17/094,319 dated Jun. 15, 2022.
Corrected Notice of Allowance for U.S. Appl. No. 17/094,319 dated May 17, 2022.
Corrected Notice of Allowance for U.S. Appl. No. 17/147,887 dated May 18, 2022.
Corrected Notice of Allowance for U.S. Appl. No. 17/340,166 dated Jun. 2, 2022.
Non-Final Office Action for U.S. Appl. No. 17/206,473 dated Jun. 22, 2022.
Non-Final Office Action for U.S. Appl. No. 17/206,737 dated Jun. 23, 2022.
Non-Final Office Action for U.S. Appl. No. 17/527,817 dated Jun. 15, 2022.
Notice of Allowability for U.S. Appl. No. 16/092,893 dated Jun. 8, 2022.
Notice of Allowability for U.S. Appl. No. 16/895,439 dated Jun. 8, 2022.
Notice of Allowability for U.S. Appl. No. 16/895,439 dated May 16, 2022.
Notice of Allowability for U.S. Appl. No. 16/902,893 dated May 13, 2022.

\* cited by examiner

DYNAMIC PLAYOUT BUFFER FOR DISPARATE LIVE MEDIA OUTPUT STREAM

CROSS-REFERENCE TO RELATED APPLICATIONS/INCORPORATION BY REFERENCE

This patent application claims priority to, and the benefit of U.S. Provisional Application Ser. No. 62/898,582, filed on Sep. 11, 2019, and is a Continuation-in-part of U.S. patent application Ser. No. 16/234,870, filed on Dec. 28, 2018, which claims priority to and the benefit from U.S. Provisional Application Ser. No. 62/699,131, filed Jul. 17, 2018, and which is a continuation-in-part of U.S. patent application Ser. No. 15/396,475, filed on Dec. 31, 2016.

This application also makes reference to:
U.S. application Ser. No. 16/229,310, filed on Dec. 21, 2018;
U.S. application Ser. No. 16/229,497, filed on Dec. 28, 2018;
U.S. application Ser. No. 16/229,614, filed on Dec. 21, 2018;
U.S. application Ser. No. 16/235,445, filed on Dec. 28, 2018;
U.S. application Ser. No. 16/236,673, filed on Dec. 31, 2018; and
U.S. application Ser. No. 17/016,789, filed on Sep. 10, 2020;
U.S. application Ser. No. 17/017,052, filed on Sep. 10, 2020; and
U.S. application Ser. No. 17/017,241, filed on Sep. 10, 2020.

Each of the above referenced patent applications is hereby incorporated herein by reference in its entirety.

FIELD OF TECHNOLOGY

Certain embodiments of the disclosure relate to a television content packaging and distribution system. More specifically, certain embodiments of the disclosure relate to a method and system for publishing a disparate per-client live media output stream based on dynamic insertion of targeted non-programming content and customized programming content, and for providing a dynamic playout buffer for disparate live media output stream.

BACKGROUND

Recent advancements in the field of television content packaging and distribution systems have led to a massive development of numerous technologies and broadcasting platforms that are revolutionizing the way consumer devices access and playout media content. Usually, broadcasting platforms refer to the types of networks that are used to deliver the media content to the consumers. Currently, the broadcasting platforms, such as analog terrestrial broadcast, digital terrestrial broadcast, direct-to-home satellite broadcast, cable, Internet Protocol (IP), and over-the-top television (OTT), compete and strive to increase their appeal by gaining and retaining the audience viewing the media content.

Modern streaming protocols, such as HTTP Live Streaming (HLS) and Dynamic Adaptive Streaming over HTTP (DASH), are implemented to support streaming of various live content services, such as DIRECTV NOW[SM], SLING TV[SM] and PLAYSTAYION™ VUE, to consumer devices. Due to dissemination of such modern streaming protocols in the television, radio, and broadcasting sector, it is evident that the success of broadcasting will be dependent on the ability of the network provider to gain access to the content that consumers demand, and to differentiate their offering from that of incumbent broadcasters or find breakthrough modes of media content delivery. Typically, such modern streaming protocols require that a playout buffer for a live media output stream is definite and unchanging, so that a media player at a client device can suitably create rules, based on which media segments are fetched, buffered, and played out.

Existing systems for Server-Side Ad Insertion (SSAI) support live streaming and make decisions to insert non-programming content in near real-time. However, for On-Demand streaming, such decisions to insert non-programing content are made upfront. Accordingly, amount of control the user can excerpt to influence what non-programming content is shown may get limited.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for publishing a disparate per-client live media output stream based on dynamic insertion of targeted non-programming content and customized programming content, and for providing a dynamic playout buffer for disparate live media output stream, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
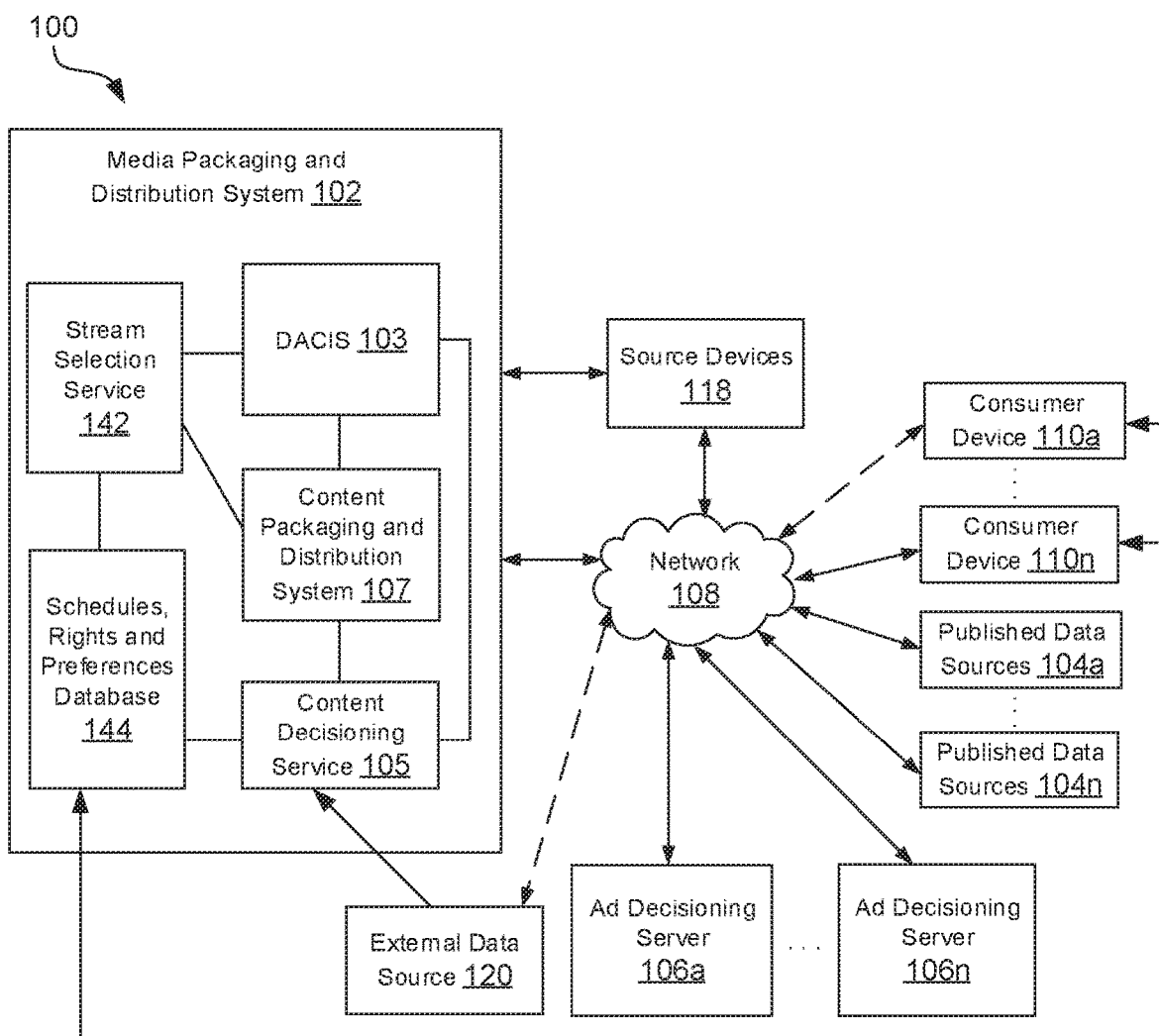
FIG. 1A is a block diagram that illustrates an exemplary system for publishing a disparate per-client live media output stream based on dynamic insertion of targeted non-programming content and customized programming content, and for providing a dynamic playout buffer for a disparate live media output stream, in accordance with exemplary embodiments of the disclosure.

Certain embodiments of the disclosure may be found in a method and system for publishing a disparate per-client live media output stream based on dynamic insertion of targeted non-programming content and customized programming content, and for providing a dynamic playout buffer for a disparate live media output stream. Various embodiments of the disclosure provide a method and system that not only provide live channel offerings in a cost-effective manner but also provide enhanced, intelligent, and personalized viewer experience to increase their appeal by retaining the audience viewing the media content.

Modern streaming protocols, such as HLS and DASH, break media content into numerous small media content segments, typically less than 10 seconds in length. Further, the modern streaming protocols implement manifests that instruct a media player on what media content segment to retrieve and play next. The manifest may enlist the media segments that make up the full length of the media asset. The manifest may include information, based on which the media player at a consumer device may be able to determine the media segments. The manifest and/or media content segment may also include and/or specify additional information to facilitate a media player to transition smoothly between media content streams from different sources. The manifest may be used for creating a playlist of multiple media content files, or for interrupting media content with advertising and then resuming the media content.

Such modern streaming protocols support video-on-demand (VOD) assets and live content as well. The VOD assets prepared for distribution, for example Internet distribution, may have a sequence of short duration segments added to a manifest. The short duration segments may be separate physical files or pointers (real or to be calculated) to the short media content segments inside a larger file. On the other hand, in case of live content, new short content media segments are made available as soon as they are created. In some protocols, each new segment is added to a manifest while in others the media player is provided with information that may be utilized to calculate what the next live segment will be. In the latter case, a signal in the media content itself may be utilized to inform the player when to re-inspect or check the manifest for a change in media content. In live streaming, delivery of live content is supported by making available each new short media content segments as soon as such media content segments are generated. In some protocols, new media content segments may be added to the manifest, while in others, the media player calculates necessary information about the next live media content segments.

Further, in live streaming, a manifest is published that represents an index of media segments to be played/consumed by a client device. As a live stream has no definable end, it may not be possible for such index to point to all past and future media segments. As media segments are published and/or played, the oldest media segment is removed, a new media segment appended to the index, and thus, a moving playout buffer or a live window of the media segments is created. Typically, such modern streaming protocols require that the playout buffer for a live media output stream is definite and unchanging, so that a media player at a client device can suitably create rules, based on which media segments are fetched, buffered, and played out.

In accordance with various embodiments of the disclosure, a system is provided for publishing a disparate per-client live media output stream based on dynamic insertion of targeted non-programming content and customized programming content. One or more processors in the system may be configured to receive a first manifest request from a first client device, wherein the first manifest request comprises one or more parameters. The one or more processors in the system may be further configured to determine a first additional content that comprises a customized first programming content and a targeted first non-programming content for the first client device based on the one or more parameters and the associated indexed metadata. The one or more processors in the system may be further configured to generate a first programming schedule for the first client device based on the selected one or more live input streams and/or the one or more pre-encoded media assets, the associated indexed metadata, and the determined first additional content. Accordingly, one or more live input stream manifests and/or one or more pre-encoded media asset manifests published in a content delivery network and associated indexed metadata may be selected based on the one or more parameters. The one or more processors in the system may be further configured to publish a first disparate live media output stream manifest for the first client device based on insertion of the selected one or more live input stream manifests and/or the one or more pre-encoded media asset manifests, the associated indexed metadata, and the determined first additional content in accordance with the first programming schedule generated for the first client device.

In accordance with another aspect of the disclosure, a system is provided for publishing a first programming schedule that may reference at least one or more pre-encoded media assets and/or one or more live input streams. The first programming schedule may comprise one or more playout buffer features enabled via one or more constraints and rights. Each playout buffer feature of the one or more playout buffer features may be associated with a corresponding number of media segments that may represent the one or more pre-encoded media assets and/or one or more live input streams. A request may be received that comprises at least a stream identifier and at least an additional parameter. In accordance with a playout buffer feature from the one or more playout buffer features and at least the additional parameter, manifest data and indexed metadata of one or more media segments associated with the stream identifier may be inserted to a first disparate live media output stream manifest. Accordingly, a first disparate live media output stream may be generated.

FIG. 1A is a block diagram that illustrates an exemplary system for publishing a disparate per-client live media output stream based on dynamic insertion of targeted non-programming content and customized programming content, and for providing a dynamic playout buffer for disparate live media output stream, in accordance with exemplary embodiments of the disclosure. Referring to FIG. 1A, the system 100, comprises a media packaging and distribution system 102 that is communicatively coupled to published data sources 104a, . . . , 104n, Ad decisioning servers 106a, . . . , 106n, via a network 108 and/or other programmatic means. There are shown consumer devices 110a, . . . , 110n that are communicatively coupled to the network 108. The media packaging and distribution system 102 may comprise at least a DACIS 103, a Content Decisioning Service (CDS) 105, a Content Packaging and Distribution System (CPDS) 107, a stream selection service 142, and a repository of schedules, rights, and user preferences database 144. There are also shown source devices 118 communicatively coupled to the media packaging and distribution system 102 through the network 108. An external data source 120 is also provided, which is communicatively coupled to the media packaging and distribution system 102 through the network 108.

The media packaging and distribution system 102 may comprise suitable logic, circuitry, and interfaces that may be configured to execute code that handles media content comprising audio, video, images, metadata, manifests, and/or other data (embedded and/or externally referenced). The media content may include a video, an audio, a combination of audio and video presentations, and/or embedded or externally referenced metadata, a combination of multiple-audio, multiple-video, and/or embedded or externally referenced metadata. Accordingly, the media packaging and distribution system 102 publishes a disparate per-client live media output stream based on dynamic insertion of targeted non-programming content and customized programming content.

In this regard, the media packaging and distribution system 102 may provide video programming services to viewers, usually for a subscription fee (such as pay television). The media packaging and distribution system 102 also handles distribution, for example, multicasting, unicasting, broadcasting, streaming, for one or more channels to be viewed on one or more of the plurality of consumer devices 110a, . . . , 110n.

The media packaging and distribution system 102 may be operated by an entity related to handling or distribution of media content, for example, a broadcast provider or operator, or a network provider or network operator. The entity related to handling or distribution of media content may also be referred to as a content owner, a distributor, a syndicator, a re-distributor, a content aggregator, a search, discovery, or cataloging service provider, or any other entity actively or passively involved with the distribution, cataloging, or referencing of complete or partial presentations of media content. Throughout this document, the terms broadcast provider or broadcast operator, and network provider or network operator may be utilized to refer to the entity related to handling or distribution of media content, interchangeably. The broadcast provider may handle a single channel or a plurality of channels, or one or more networks. The broadcast provider may be configured to distribute content via one or more platforms, for example, traditional over-the-air broadcast channels, radio, cable television networks, satellite communication networks, the Internet, and/or other content delivery networks (CDNs). In this regard, the broadcast provider may be configured to execute code that communicates linear video feeds (also referred to as a network television feed or broadcast feed) to the media packaging and distribution system 102. In a broadcast chain, the broadcast provider may receive actual content, for example, from a production studio, in one or more source formats. Examples of the one or more source formats may include, but are not limited to a tape file, or a live feed that may be further converted to a serial digital interface (SDI) video interface and/or on a high-definition SDI (HD-SDI) video interface for processing and playout. The broadcast provider may further process the content, such as insertion of graphics, closed captions, preparation of programming schedule, insertion of triggers, and the like, and provide final delivery by a broadcasting apparatus. The communicated linear video feed and the playout schedule may correspond to a channel, such as CNN channel that is broadcast to the media packaging and distribution system 102, via a communication network. The linear video feed may be broadcasted as a multi-program transport stream (MPTS) (also referred to as a live video feed) to the media packaging and distribution system 102, via the network 108. The broadcast provider may be owned by (or associated to) a broadcast provider or operator, a network provider or operator, or a content provider or operator.

The media packaging and distribution system 102 may receive the MPTS, which includes the signaling content and metadata, from the broadcast provider based on, for example, current society of cable telecommunication engineers (SCTE) standards (SCTE-35 and SCTE-224) to control web and regional blackouts, network end of day switching, and advertisement insertion. For example, the media packaging and distribution system 102 may be signaled for various blackout types with in-band SCTE-35 message. Further, the media packaging and distribution system 102 may receive program metadata that specifies certain events or operations, such as, for example, when to blackout shows. Examples of legacy distribution system that may be benefitted from the media packaging and distribution system 102 may include direct-broadcast satellite (DBS) providers, cable television (CATV) systems, and other wireline video providers and competitive local exchange carriers (CLECs) using, for example, IPTV.

The DACIS 103 may comprise suitable logic, circuitry, and interfaces that may be configured to leverage one-to-one scale of traditional SSAI systems to support custom programming content choices and not just targeted non-programming content. For example when the user selects to join a live stream, a content decisioning system, such as the CDS 105 could determine that, instead of joining the live stream for the last few minutes of a program prior to the start of the intended program, the user should instead be shown content more relevant to the user so as to prevent them from tuning away, e.g. show a personalized set of basketball highlights and ads to a user who likely joined the stream to watch a basketball game that is coming on next. The DACIS 103 replaces original content in the live stream prior to game start with user relevant content, such that upon its conclusion, the user is seamlessly presented the game.

The DACIS 103 may be further configured to, via a programming schedule or tag indicator in a disparate live media output stream manifest, be notified of one or more content graphical treatment opportunities within the media content. The DACIS 103 may be further configured to make required non-programming content calls on behalf of the plurality of consumer devices 110a, . . . , 110n. Accordingly, the DACIS 103 may provide the plurality of consumer devices 110*a*, . . . , 110*n* with information needed to execute the graphical treatment graphical content via a secure out-of-band channel between the DACIS 103 and the plurality of consumer devices 110*a*, . . . , 110*n*. In accordance with an embodiment, the DACIS 103 may be configured to include not showing non-programming content that a user of a consumer device may elected to skip or rated poorly in an earlier non-programming content break. Further, the DACIS 103 may enable the user to skip non-programming content as the user interacted with a previous non-programming content or made a purchase and the advertiser elected to sponsor the remainder of the programming content.

In accordance with an embodiment, the DACIS 103 may be configured to provide seamless failover between redundant disparate live media output streams for large events, thus improving reliability. In certain instances, some of the plurality of consumer devices 110*a*, . . . , 110*n* may support a primary and backup disparate live media output streams and are able to fail between them. In other instances, others of the plurality of consumer devices 110*a*, . . . , 110*n* may not support the primary and backup disparate live media output streams. In such instances, the consumer devices may attempt to join an alternative disparate live media output stream after occurrence of an event such as a device failure or crash. For such consumer devices, the DACIS 103 may be configured to monitor both the primary and backup disparate live media output streams, and if there is a failure, write the alternative disparate live media output stream into the disparate live media output stream manifest.

Each of the plurality of published data sources 104*a*, . . . , 104*n* may be coupled to one or more television networks and may comprise suitable logic, circuitry, and interfaces that may be configured to execute code that provides actual audiences for programs that were distributed. As illustrated in FIG. 1A, the plurality of published data sources 104*a*, . . . , 104*n* are coupled to the media packaging and distribution system 102 via the network 108 and configured to monitor audience drift to or away from a tuned channel airing a live media output stream. The plurality of published data sources 104*a*, . . . , 104*n* may provide actual audiences for programs to the indexing and storage system 116. An exemplary published data source may be Nielsen. Nielsen has the capability to determine when a viewer watches the same set of media items, for example, advertisements and/or promotional content, in programming data, such as an episode, in a live video feed within 3 days of original airing, and provide Nielsen "C3" credit. Another exemplary published data source may be a published database that provides ratings for a media item, such as gross rating point (GRP). The GRP is advertising or promotion impact measure for each advertising and/or promotional campaigns, known in the art. Other exemplary published data sources may also include direct/indirect access to other public or private data sources (persistent or ephemeral) through programmatic means.

The CDS 105 may comprise suitable logic, circuitry, and interfaces that may be configured to determine, upon request, which programming content (or partial programming content) to deliver back to the plurality of consumer devices 110*a*, . . . , 110*n*. Thus, the CDS 105 may be configured to insert additional content (including non-programming content) or replace existing content, according to one or more parameters provided by the plurality of consumer devices 110*a*, . . . , 110*n* and data stored in various external systems and/or databases.

The Ad decisioning servers 106*a*, . . . , 106*n* may comprise suitable logic, circuitry, and interfaces that may be configured to implement at least an advertisement decisioning component that may be used during a real-time content or advertisement placement activity, for example during dynamic ad insertion. The Ad decisioning servers 106*a*, . . . , 106*n* may further determine ad-load opportunity, based on targeting data from schedules, rights, and user preferences database.

For example, commercial or non-commercial advertisements may be dynamically inserted within program segments of the live input streams based on the detected upcoming indicator, such as an inbound trigger, a signaling point, and/or a signal in a pre-encoded media asset and/or a live input stream by the Ad decisioning servers 106*a*, . . . , 106*n*.

In an embodiment, the DACIS 103 may be generalized as a proxy between the plurality of consumer devices 110*a*, . . . , 110*n* and the Ad decisioning servers 106*a*, . . . , 106*n*. In one implementation, a request is sent from a consumer device to the DACIS 103. The DACIS 10 may call on of the Ad decisioning servers 106*a*, . . . , 106*n* to determine a set of non-programming content that may be inserted into the disparate live media output stream.

The CPDS 107 may comprise suitable logic, circuitry, and interfaces that may be configured to index programming content, which is prepared for usage by a system, such as the stream publishing engine 114. The CPDS 107 may further define metadata detailing various facets of the programming and/or non-programming content including duration, known locations and opportunities for programming and/or non-programming content insertion/replacement.

The network 108 may be any kind of network, or a combination of various networks, and it is shown illustrating exemplary communication that may occur between the Ad decisioning servers 106*a*, . . . , 106*n* and the media packaging and distribution system 102. For example, the network 108 may comprise one or more of a cable television network, the Internet, a satellite communication network, a wide area network (WAN), a medium area network (MAN), and a local area network (LAN). Although a network 108 is shown, the disclosure is not limited in this regard; accordingly, other exemplary modes may comprise uni-directional or bi-directional distribution, such as packet-radio, satellite. Furthermore, the network 108 is an exemplary embodiment of a distribution system.

The consumer devices 110*a*, . . . , 110*n* may refer to end-user devices or consumption devices where the content is played to be consumed by a user. The number of impressions of a media item, such as an advertisement and/or promotional media, on such plurality of consumer devices 110*a*, . . . , 110*n* determines the advertising impact or promotion impact and number of actual audiences achieved during campaigns. Examples of the consumer devices 110*a*, . . . , 110*n* may include, but are not limited to, connected TVs, connected TV with paired and/or connected devices (e.g., HDMI sticks, tablets), personal computer, smartphone, tablet, OTT set-top, or hybrid set-top, and second screen devices such as smartphones, tablets, game consoles, personal computers, set-top boxes, and embedded devices. The consumer devices 110*a*, . . . , 110*n* may further include process/system that may process the output for any means, regardless of the capability or intent to decode for media presentation, and on which the consumer may launch a web page, a web application, or a web service to view media content.

The source devices 118 may comprise suitable logic, circuitry, and interfaces that may be configured to communicate a live media feed or live input streams of a channel, such as an existing channel, to the media packaging and distribution system 102. In accordance with an embodiment, the live input streams of the channel may correspond to a broadcast feed. The source device 118 may be communicatively coupled to the network 108.

The external data source 120 may comprise suitable logic, circuitry, and interfaces that may be configured to execute code that handles retrieval and storage of audience data that corresponds to subscribers of the plurality of consumer devices 110a, . . . , 110n. The audience data may include demographics data, audience targeting data, trending data, device type data, device platform data, and content recognition-based data, such as automatic content recognition (ACR)-based data. The trending data may comprise information on what's trending in the social networks (or platforms), such as Twitter®, Facebook®, and the like. The trending data also comprises information on what's trending based on social engagement, such as number of likes or votes to a particular media item, or number of people watching a particular media item. The trending data may indicate an aggregate interest level of a number of users in the social networks for a particular media item. For example, a thousand or more shares, or likes by a number of users may indicate a highly popular media item.

The stream selection service 142 may comprise suitable logic, circuitry, and interfaces that may be configured to execute code that may be configured to provide a consumer device, for example, the consumer device 110a, requesting to view the disparate live media output stream with a correct variant of disparate live media output stream, based on the geolocation and identification of the consumer device 110a, along with data retrieved from the repository of schedules, rights, and user preferences database 144.

The repository of schedules, rights, and user preferences database 144 may comprise suitable logic, circuitry, and interfaces that may be configured to store the schedules for all source feeds, availability rights for all the content in the schedules, regional blackout zones for the various sports leagues, predefined location-based viewing preferences, individual client viewing preferences, and any viewing or transition rules provided by the stream owner operator.

In operation, in accordance with an aspect of the disclosure, upon receiving a first manifest request from a consumer device, the DACIS 103 may be configured to publish a manifest of a first disparate live media output stream for the consumer device. The first disparate live media output stream may be chosen by the DACIS 103, at the time of the first manifest request, to best target a consumer device, according to a plurality of client-specific parameters. The plurality of client-specific parameters may comprise user preferences and identifiers, consumer device preferences and identifiers, and one or more rules/rights governed by geolocation data and current position of playback of a first disparate live media output stream at the consumer device. The first disparate live media output stream manifest may be generated, at the time of the first manifest request, to include additional content, such as the targeted non-programing content and the customized programming content. Examples of the targeted non-programing content may include, but are not limited to, advertisements, personalized (per-user) advertisements, video advertisements, and graphical treatment (such as overlays). The targeted non-programing content may further include first interactive elements, such as an option to purchase goods or content, and second interactive elements. The second interactive elements may further affect the generation of the first disparate live media output stream manifest by providing various options. For example, a first option may be to skip a given ad, a second option may be to skip future ads for remainder of the playback of the first disparate live media output stream, a third option may be to choose one or more ads of a given category, or a fourth option may be too watch all ads immediately to avoid ads for the remainder of the playback. Examples of the customized programming content may include, but are not limited to, promotional content, short-form content, or alternate content (content replacing that of the requested first disparate live media output stream.

The DACIS 103 may further receive metadata associated with the content and additional content for the first disparate live media output stream from the CPDS 107. The metadata may include, for example, ad break locations, graphical treatment marker/triggers, SCTE35 markers, content duration, personalized content opportunities, and one or more decision point locations.

In accordance with an embodiment, the DACIS 103 may be configured to convert a pre-encoded media asset to the first disparate live media output stream to facilitate one or more subsequent modifications on the first disparate live media output stream. The one or more subsequent modifications may correspond to a user selection, a user preference, a change in a first programming schedule, or a time or geolocation-based rule. In accordance with an embodiment, the DACIS 103 may be configured to perform another conversion of remainder of the first disparate live media output stream into the one or more pre-encoded media assets to facilitate download of the one or more pre-encoded media assets at the consumer device and mitigate dependency on the DACIS 103 for playback of remaining portion.

In accordance with another aspect of the disclosure, upon receiving the first manifest request, a manifest of the first disparate live media output stream may be altered to include additional or alternate content, apart from the content originally scheduled for playback. The DACIS 103 may be configured to determine which content to include/replace by utilizing one or more parameters. The one or more parameters may include, but not limited to, URL requested for playback, and an identifier referencing a record for an existing first disparate live media output stream or an external connected system, such as the CPDS 107. The one or more parameters may include a plurality of client-specific parameters that may comprise user preferences and identifiers, consumer device preferences and identifiers, and one or more rules/rights governed by geolocation data and current position of playback of a first disparate live media output stream at the consumer device. The one or more parameters may include a plurality of client-specified attributes derived from user interaction with the consumer device. The plurality of client-specified attributes may include, for example, a preference for a given type and/or category (or categories) of programming content, a possible time constraint or duration to fill with content. The time constraint or duration to fill with content may be determined by user preferences from an external system, such as the repository of schedules, rights, and user preferences database 144, a range defined in the first client manifest request, schedule tolerances, as defined in the repository of schedules, rights, and user preferences database 144, device preferences/identifiers declared in the first manifest request, and a prior consumer request, or found in the repository of schedules, rights, and user preferences database 144. The time constraint or duration to fill with content may be further determined by geolocation information declared in the first manifest request or found in the first manifest request, or external database, such as the repository of schedules, rights, and user preferences database 144, or external systems, such as a content recommendation engine. The one or more parameters may further include rules, rights, and schedule data stored in the DACIS 103 or an adjacent, external system—such as the repository of schedules, rights, and user preferences database 144.

In accordance with an embodiment, the DACIS 103 may determine where to place new or alternate content within the requested disparate live media output stream. The DACIS 103 may utilize metadata, such as ad break locations, graphical treatment markers/triggers, SCTE35 markers, content duration, and one or more decision point locations. The metadata may be sourced from a system that has indexed metadata for the asset, such as the CPDS 107. The DACIS 103 may generate a new schedule from the determined alterations in the first disparate live media output stream. The DACIS 103 may transmit resulting schedule to the stream publishing engine 114 to generate a final disparate live media output stream. The final disparate live media output stream may be delivered back to originating client. The stream publishing engine 114 may generate the first disparate live media output stream manifest based on one of a pre-defined conversion modes. The pre-defined conversion modes may correspond to pre-encoded media assets to live stream mode, pre-encoded media assets to live stream mode with scalable architecture, a live stream to live stream mode, and a mixed mode corresponding to switching between pre-encoded media assets and live streams.

The final disparate live media output stream may contain one or more decision points, which, if configured, may be presented by the consumer device to the user. In this regard, the final disparate live media output stream may be delivered as a live stream between the decision points whether or not the programming content selected by a user is pre-encoded media asset or a live input stream. At the one or more decision points, the user interaction may correspond to one of a desired selection corresponding to the user interaction with one or more interactive elements, or a default selection corresponding to non-interaction of a user with the customized first programming content and/or the targeted first non-programming content in the first disparate live media output stream played back by the media player. The desired selection or the default selection may be transmitted to an external storage system that is the repository of schedules, rights, and user preferences database 144.

In accordance with an embodiment, at the one or more decision points, the one or more interactive elements may facilitate exclusion of the targeted first non-programming content or the customized first programming content and replacement by default content. The one or more interactive elements may further facilitate selection of alternate customized first programming content, selection of a subsequent second programming content, approval or disapproval of the selected customized first programming content, and/or exclusion of subsequent second non-programming content for a remaining portion of the first disparate live media output stream played back by the media player. The one or more interactive elements may further facilitate selection of one or more targeted first non-programming content of a specific category, or viewing of some or all of the targeted first non-programming content immediately to avoid some or all of the targeted first non-programming content for the remaining portion of the first disparate live media output stream played back by the media player.

In accordance with another aspect of the disclosure, the DACIS 103, upon the first manifest request, may seamlessly transition the first additional content to an alternate additional content according to determination made by the stream selection service 142, based on one or more transition parameters. The one or more transition parameters may comprise one or more parameters from the first manifest request, current state of the first disparate live media output stream manifest determined based on accessibility, regular update, and suitable encoding, digital rights management, and compatibility with the first client device, rules provided by a stream owner operator, and user preferences defined in the repository of schedules, rights, and user preferences database 144.

The DACIS 103 may retrieve alternate metadata for the alternate additional content from the CPDS 107. The alternate metadata may indicate a location to seamlessly transition from the first additional content to the alternate additional content, and may include ad break locations, graphical treatment markers/triggers, SCTE35 markers/triggers, content duration, and/or one or more decision points. The DACIS 103 may be configured to determine placement of the alternate additional content within the first disparate live media output stream manifest based on the associated indexed metadata and the alternate metadata. The DACIS 103 may generate an alternate programming schedule for the first client device based on the alternate additional content and the alternate metadata. The DACIS 103 may transmit the generated alternate programming schedule to the stream publishing engine 114. The stream publishing engine 114 may generate a final disparate live output stream manifest for the consumer device.

In accordance with an embodiment, the DACIS 103 may revoke the first disparate live media output stream manifest published for the first consumer device based on an identifier primitive associated with the first disparate live media output stream of the first consumer device in an instance in which a media player of the first consumer device is determined to be a plagiarized media player with unauthorized access to content. In such embodiment, the first disparate live media output stream may include at least one unique identifier inserted by the DACIS 103.

In accordance with another aspect of the disclosure, the DACIS 103 may be configured to provide a dynamic playout buffer for disparate live media output stream to be viewed on a plurality of consumer devices (such as the consumer devices 110a, . . . , 110n). The DACIS 103, may be configured to publish the first programming schedule 111 that may reference at least one or more pre-encoded media assets and/or one or more live input streams. The published first programming schedule may comprise one or more playout buffer features enabled via one or more constraints and rights. Each playout buffer feature of the one or more playout buffer features may be associated with a corresponding number of media segments that represents the one or more pre-encoded media assets and/or the one or more live input streams. The DACIS 103 may be further configured to receive a request that comprises at least a stream identifier and at least an additional parameter. The DACIS 103 may be further configured to insert manifest data and indexed metadata of one or more media segments associated with the stream identifier to a first disparate live media output stream manifest in accordance with a playout buffer feature from the one or more playout buffer features and at least the additional parameter. The DACIS 103 may be further configured to generate a first disparate live media output stream based on the insertion of the manifest data and indexed metadata to the first disparate live media output stream manifest.

Figure 1B:
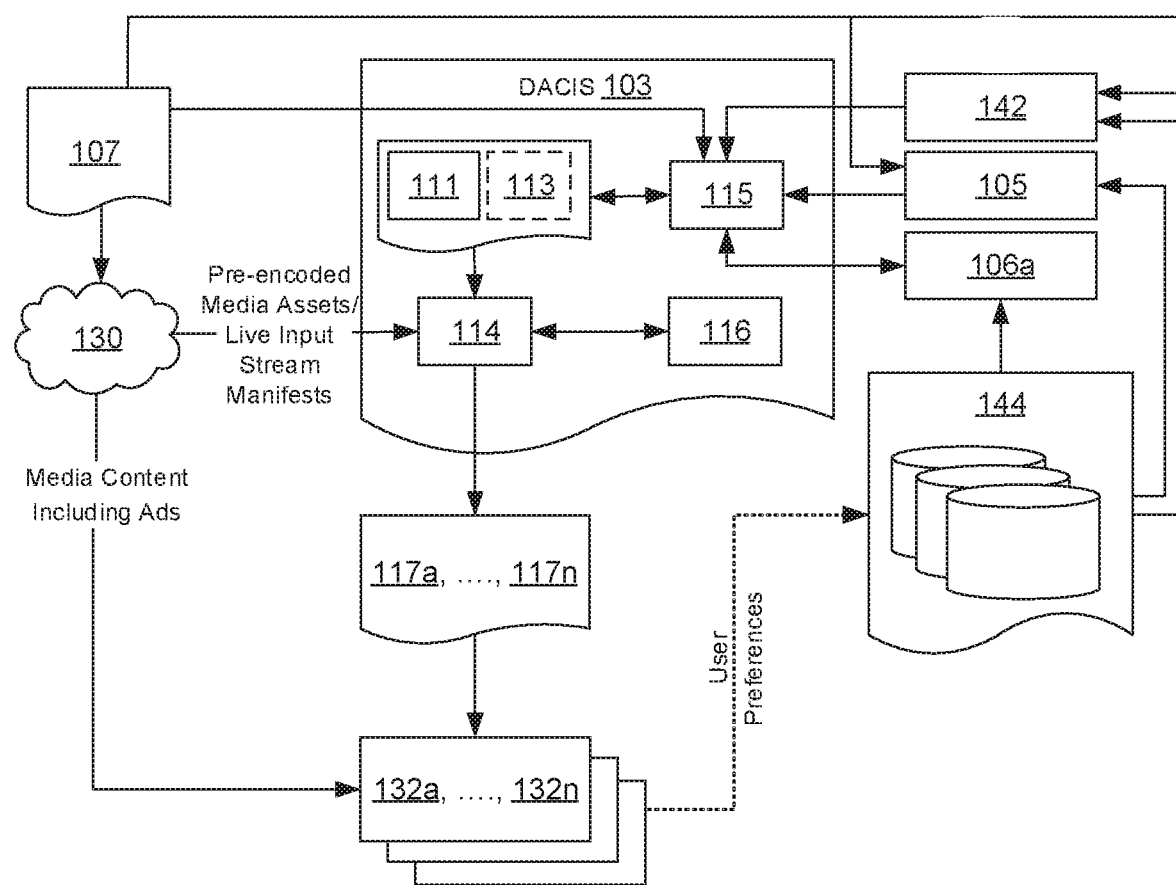
FIG. 1B is a block diagram that illustrates an exemplary dynamic ad/content insertion system (DACIS) for publishing a disparate per-client live media output stream based on dynamic insertion of targeted non-programming content and customized programming content, and for providing a dynamic playout buffer for a disparate live media output stream, in accordance with exemplary embodiments of the disclosure.

FIG. 1B is a block diagram that illustrates an exemplary DACIS for publishing an updated disparate live media output stream in mixed mode based on user selection, and for providing a dynamic playout buffer for disparate live media output stream, in accordance with exemplary embodiments of the disclosure. Referring to FIG. 1B, the DACIS 103 comprises a first programming schedule 111, an alternate programming schedule 113, a stream publishing engine 114, a personalized experience manager (PEM) 115, and an indexing and storage system 116. FIG. 1B further illustrates a content delivery system 130, which is an example of the network 108, client devices 132a, . . . , 132n, which correspond to the plurality of consumer devices 110a, . . . , 110n. There is further shown a per-client disparate live media output stream 117a, . . . , 117n for corresponding client device from the client devices 132a, . . . , 132n.

In some embodiments of the disclosure, the stream publishing engine 114, the PEM 115, and the indexing and storage system 116 may be integrated to form an integrated system, as illustrated in FIG. 1B. In some embodiments of the disclosure, as shown, the stream publishing engine 114, the PEM 115, and the indexing and storage system 116 may be distinct. In this regard, the PEM 115 may be implemented external to the DACIS 103 without loss of generality. Other separation and/or combination of the various entities of the exemplary media packaging and distribution system 102 illustrated in FIG. 1B may be done without departing from the spirit and scope of the various embodiments of the disclosure. In an embodiment, the implementation of the DACIS 103 may be on the server-side. In another embodiment, the implementation of the DACIS 103 may be on the client-side.

The first programming schedule 111 may correspond to an instruction set for a disparate live media output stream for a corresponding client device. The first programming schedule 111 may inform the stream publishing engine 114 about pre-encoded media assets and live input streams as well as when and how to switch between the various pre-encoded media assets and live input streams. The first programming schedule 111 may also support defining break durations for mid roll ads, break locations, and durations in the pre-encoded media asset and live input stream switches.

The alternate programming schedule 113 may correspond to an instruction set for an updated or alternate disparate live media output stream. The alternate programming schedule 113 may inform the stream publishing engine 114 about the alternate pre-encoded media asset and/or the alternate live input stream, and alternate additional content. Specifically, the alternate programming schedule 113 may indicate that when and how to switch between the various disparate live media output streams.

The stream publishing engine 114 in the DACIS 103 may be configured to generate disparate live media output stream manifests and variants of disparate live media output stream manifests. The stream publishing engine 114 may be configured to publish unique-to-client streaming manifests leveraging different indexes created by the indexing and storage system 116 from the various live input streams, pre-encoded media assets, targeted non-programming content and customized programming content based on a defined per-client schedule.

The PEM 115 in the DACIS 103 may be configured to personalize viewer experience of users by communicating with existing content decisioning systems, such as CDS 105, and executing/converting schedules provided, for example from the first programming schedule 111 to the alternate programming schedule 113. The PEM 115 in the DACIS 103 may be further configured to communicate with an ad server, such as the Ad decisioning server 106a, and stitching in targeted first non-programming content and customized first programming content, as required by the first programming schedule 111 and user preferences. The PEM 115 in the DACIS 103 may be further configured to generate a schedule for a disparate live media output stream of personalized content (i.e., clips or movies), communicating with the stream selection service 142 to switch or failover to different disparate live media input streams, and control overlays and other events triggered via the disparate live media output stream. In accordance with an embodiment, the stream selection service 142 may be used to switch between different output streams when a client device is requesting directly from the stream selection service 142. In accordance with other embodiment, the stream selection service 142 may be used to switch between different streams that may act as inputs for the PEM 115 and/or stream publishing engine 114 to generate a new output stream.

The indexing and storage system 116 in the DACIS 103 may be configured to ingest pre-encoded media assets, advertisement, and (continuously) live stream source manifests, indexes the media content segments, indexes one or more program indicators (such as program boundaries), non-programming indicators (such as ad break locations, overlay opportunities credits, and DRM systems supported, in the repository of schedules, rights, and user preferences database 144.

The per-client disparate live media output streams 117a, . . . , 117n may correspond to disparate live media output stream comprising live input streams and/or pre-encoded media assets to be sent back to a client device, upon request, that has been generated from a per-client schedule, such as the first programming schedule 111. Various media container formats of the live input streams and/or pre-encoded media assets may include, but are not limited to, transport stream (TS), fragmented MP4 (fMP4), Common Media Application Format (CMAF) and the like.

The content delivery system 130 may correspond to the network 108, described in FIG. 1. The content delivery system 130 may comprise networks configured for distributing media content to the plurality of client devices 132a, . . . , 132n. Generally, the term "content," "metadata," "media," and similar words are used interchangeably to refer to any type of media—audio, videos, datacasts, music, text, images, graphics, articles, still photos, animated photos, moving photos, photo galleries, video galleries, infographics, maps, polls, guest biographies, tweets or other social media, blog posts, and/or the like. The content delivery system 130 may be configured to provide a plurality of disparate live media output streams to the plurality of client devices 132a, . . . , 132n (in case packaged content is available on the network 108) or from the content packaging and distribution system 107 (in case packaged content is not available on the network 108). The plurality of disparate live media output streams may be provided to the plurality of client devices 132a, . . . , 132n via, for example, a transport stream, a segmented streaming, a progressive download, or any other modes of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

The client devices 132a, . . . , 132n may correspond to consumer devices 110a, . . . , 110n. In accordance with an embodiment, the client devices 132a, . . . , 132n may be content recognition (CR)-enabled devices, such as automatic content recognition enabled devices. The client devices 132a, . . . , 132n may be configured to communicate with the Ad decisioning server 106a, via the content delivery system 130, or a separate communication network.

The stream selection service 142 may comprise suitable logic, circuitry, and interfaces that may be configured to provide a client device, for example, the client device 132a, requesting to view a disparate live media output stream with a correct variant of disparate live media output stream, based on the geolocation and identification of the client device 132a, along with data retrieved from the repository of schedules, rights, and user preferences database 144. The stream selection service 142 may further receive user preferences of a user associated with the client device 132a, for example, to view the recommended/desired existing disparate live media output stream on the client device 132a. The stream selection service 142 may further store the received preferences in the repository of schedules, rights, and user preferences database 144, and also communicate with the PEM 115. The stream selection service 142 acts as an interface between the PEM 115 of the media packaging and distribution system 102 and the plurality of client devices 132a, . . . , 132n.

The repository of schedules, rights, and user preferences database 144 may comprise suitable logic, circuitry, and interfaces that may be configured to execute code to store content rights, user preferences, regional preferences, live schedules, and regional rights. For example, content rights may store availability and platform rights for live input streams in the first programming schedules, such as the first programming schedule 111, the user preferences may store preferences of individual user viewing preferences, the regional preferences may store regional viewing preferences, the live schedules may store the schedules for live input streams, and the regional rights may store regional blackout zones for the various sports leagues, for example. The repository of schedules, rights, and user preferences database 144 may further store data supplied from a stream owner/operator including requirements, preferences, such as pre-defined location-based viewing preferences, stream transition rules, and any required client data, such as service level and zip code.

In operation, in accordance with an aspect (regarding just-in-time insertion of non-programming content and/or programming content) of the disclosure, a media player in a consumer device, such as the consumer device 110a, may send a first manifest request to the DACIS 103 to receive a disparate live media output stream manifest to begin or continue playback. The first manifest request may comprise one or more parameters, such as universal resource locators and/or identifiers referencing records for one or more live input streams or one or more pre-encoded media assets in the CPDS 107, a plurality of client-specific parameters, and a plurality of client-specified attributes derived from a user interaction with the consumer device, such as the consumer device 110a. The plurality of client-specific parameters may comprise user preferences and identifiers, client device preferences and identifiers, and one or more rules governed by geolocation data and current position of playback of a first disparate live media output stream at the consumer device, such as the consumer device 110a. The plurality of client-specified attributes may comprise the user interaction with interactive content in a customized first programming content and a targeted first non-programming content, and a preference for a type and/or category of the targeted first non-programming content and/or the customized first programming content. The user interaction with the interactive content may comprises a selection to exclude the targeted first non-programming content and/or the customized first programming content, a selection to include a subset of the targeted first non-programming content and/or the customized first programming content, and a selection to include all of the targeted first non-programming content and/or the customized first programming content within one or more specified non-programming content locations.

In case the first manifest request is for a first disparate live media output stream, the PEM 115 transmits the one or more parameters in the first manifest request to the stream selection service 142. The stream selection service 142 may determine live input streams and/or pre-encoded media assets, based on the one or more parameters in the first manifest request and in repository of schedules, rights, and user preferences database 144. The stream selection service 142 may transmit the determined identifiers or URLs of the live input streams and/or pre-encoded media assets to the PEM 115. The PEM 115 may then transmit the first manifest request to the CPDS 107 to retrieve metadata for the determined live input streams and/or pre-encoded media assets. The metadata may include, for example ad break locations, overlay markers/triggers, SCTE35 markers, and content duration.

The PEM 115 of the DACIS 103 may further transmit the received first manifest request to the CPDS 107 based on the selected one or more live input streams and/or one or more pre-encoded media assets. The PEM 115 may receive the indexed metadata, for example non-programming indicators, such as ad break locations, graphical treatment indicators, such as overlay markers/triggers, programming indictors, such as SCTE35 markers and content duration, from the CPDS 107.

The PEM 115 may further identify the one or more content placement opportunities defined by the metadata associated with the one or more live input streams and/or one or more pre-encoded media assets. The PEM 115 may further receive additional content, such as targeted first non-programming content from the Ad decisioning server 106a, and customized first programming content to match one or more personalization parameters from the CDS 105.

The PEM 115 may be configured to generate the first programming schedule 111 for a first client device, such as the client device 132a, based on selected one or more live input streams and/or the one or more pre-encoded media assets, the associated indexed metadata, and the determined first additional content. The generated first programming schedule 111 may be delivered to the stream publishing engine 114. The stream publishing engine 114 may be configured to select the one or more live input stream manifests and/or the one or more pre-encoded media asset manifests published in the content delivery system 130. The indexing and storage system 116 may be configured to index the plurality of media segments indicated by the one or more pre-encoded media asset manifests and the one or more live input stream manifests, the associated indexed metadata, the targeted first non-programming content, and the customized first programming content may be indexed based on the first programming schedule 111 generated for the first client device, for example the client device 132a. The stream publishing engine 114 may be further configured to publish the first disparate live media output stream manifest for the first client device, for example the client device 132a. The DACIS 103 may transmit the published first disparate live media output stream manifest to the media player of the first client device for playback of the first disparate live media output stream, for example the disparate live media output stream 117a.

In accordance with an embodiment, the PEM 115 may receive a user interaction from the media player of the first client device, for example the client device 132a. The user interaction may correspond to one of a desired selection corresponding to the user interaction with one or more interactive elements, or a default selection corresponding to a non-interaction of the user with the customized first programming content and/or the targeted first non-programming content in the first disparate live media output stream 117a played back by the media player. Based on the user interaction with the interactive content, the PEM 115 of the DACIS 103 may be configured to modify the remaining portion of the first programming schedule 111 that generates the first disparate live media output stream 117a corresponding to the first manifest request generated by the first client device, such as the client device 132a.

In accordance with another aspect (regarding personalized insertion of playlist of non-programming content and/or programming content) of the disclosure, the DACIS 103 may be configured to receive the first manifest request from the first client device, such as a client device 132a, to begin or continue playback of a first disparate live media output stream, for example the disparate live media output stream 117a. In such embodiment, in addition to the plurality of client-specific parameters described above, the plurality of client-specified attributes may comprise a preference for a given type and/or category (or categories) of targeted non-programming content or customized programming content, and a possible time constraint (duration) to fill with content. Thereafter, in similar manner as described above, the PEM 115 may transmit the one or more parameters in the first manifest request to the stream selection service 142. The stream selection service 142 may determine live input streams and/or pre-encoded media assets, based on the one or more parameters in the first manifest request and in repository of schedules, rights, and user preferences database 144. The stream selection service 142 may transmit the determined identifiers or URLs of the live input streams and/or pre-encoded media assets to the PEM 115. The PEM 115 may then transmit the first manifest request to the CPDS 107 to retrieve metadata for the determined live input streams and/or pre-encoded media assets. The metadata may include, for example, categories to which content is assigned to (for example, "basketball", "sports", "Knicks"), in addition to ad break locations, overlay markers/triggers, SCTE35 markers, and content duration.

The PEM 115 may identify one or more content placement opportunities defined by the metadata and may transmit a request to the CDS 105 to determine the customized first programming content from the CPDS 107 for matching one or more personalization parameters. Accordingly, the PEM 115 may generate the first programming schedule 111 defining locations and types of one or more decision points defined by the one or more content placement opportunities in the indexed metadata. The one or more decision points may define personalized content preferences, skipping of personalized content and moving to default content, and approval or disapproval of the personalized content. The remaining operations may be similar to the just-in-time insertion of non-programming content and/or programming content.

In accordance with another aspect (regarding stream failover) of the disclosure, the DACIS 103 may be configured to receive the first manifest request from the first client device, such as a client device 132a. The first manifest request may comprise one or more parameters, as described above. The PEM 115 may transmit the received first manifest request that comprises the one or more parameters to the stream selection service 142. The stream selection service 142 may determine if the set of criteria associated with the first disparate live media output stream is satisfied. The set of criteria may include accessibility of the first disparate live media output stream, update of the first disparate live media output stream and/or compatibility of the first disparate live media output stream having media and/or a manifest with the first manifest request. The stream selection service 142 may be further configured to determine the one or more live input streams and/or one or more pre-encoded media assets based on the one or more parameters in the first manifest request, and additional parameters retrieved from the repository of schedules, rights, and user preferences database 144. The stream selection service 142 may be further configured to determine the one or more live input streams and/or one or more pre-encoded media assets based on rules provided by a stream owner/operator (such as a regional blackout for the first client device leading to an alternative stream to watch) and user preferences (that exclude certain categories) defined in the repository of schedules, rights, and user preferences database 144.

When the set of criteria associated with the first disparate live media output stream is not satisfied, the stream selection service 142 may select a pre-encoded asset indicated in the first manifest request to continue playback as the first disparate live media output stream. The PEM 115 may receive the universal resource locators and/or identifiers that reference records for the selected one or more live input streams or alternate one or more pre-encoded media assets based on the one or more parameters and additional parameters retrieved from the repository of schedules, rights, and user preferences database 144. The PEM 115 may further transmit the received first manifest request to the CPDS 107 based on the selected one or more live input streams or alternate one or more pre-encoded media assets. The PEM 115 may further receive the alternate metadata for the alternate additional content from the CPDS 107. The metadata may include, for example, Ad break locations, overlay markers/triggers, SCTE35 markers/triggers, content duration, and one or more decision points. The alternate metadata may further include a location to transition from the first additional content to the alternate additional content. Thereafter, a placement of alternate additional content within the first disparate live media output stream manifest may be determined based on the associated indexed metadata and the alternate metadata. The PEM 15 may further generate the alternate programming schedule for the first client device, such as the client device 132a, based on the alternate additional content and alternate metadata. Accordingly, the stream selection service 142 may publish the final disparate live output stream manifest for the first client device, such as the client device 132a, based on the generated alternate programming schedule.

In accordance with another aspect (regarding dynamic playout buffer for disparate live media output stream) of the disclosure, the PEM 115 of the DACIS 103 may be configured to publish the first programming schedule 111 that references at least one or more pre-encoded media assets and/or one or more live input streams. The published first programming schedule may comprise one or more playout buffer features enabled via one or more constraints and rights.

A first playout buffer feature of the one or more playout buffer features may correspond to a minimum playout buffer size. The minimum playout buffer size indicates a minimum number of media segments that represents the one or more pre-encoded media assets and/or the one or more live input streams, as defined in the first programming schedule 111. A second playout buffer feature of the one or more playout buffer features may correspond to a maximum playout buffer size. The maximum playout buffer size indicates a maximum number of media segments that represents the one or more pre-encoded media assets and/or the one or more live input streams, as defined in the first programming schedule 111. A third playout buffer feature of the one or more playout buffer features may correspond to a default playout buffer size. The default playout buffer size indicates a pre-specified number of media segments that represents the one or more pre-encoded media assets and/or the one or more live input streams, as defined in the first programming schedule 111. In accordance with an embodiment, the PEM 115 of the DACIS 103 may be configured to determine a fourth playout buffer feature based on a reference to the repository of schedules, rights, and preferences database 144 or a third-party database by the first programming schedule 111.

In accordance with an embodiment, the stream publishing engine 114 in the DACIS 103 may be configured to receive a request that may comprise at least a stream identifier and at least an additional parameter. The stream publishing engine 114 may query the indexing and storage system 116 based on the received request. Accordingly, the stream publishing engine 114 may determine the first programming schedule 111, manifest data and indexed metadata associated with the query from the indexing and storage system 116. The manifest data and the indexed metadata may correspond to one or more media segments associated with the stream identifier to be inserted to the first disparate live media output stream manifest in accordance with the first programming schedule 111, the playout buffer feature from the one or more playout buffer features, and at least the additional parameter.

In accordance with an embodiment, the stream publishing engine 114 may fail to validate that the one or more media segments associated with the stream identifier are eligible for the playout and accordingly, an error notification may be generated. In accordance with another embodiment, the stream publishing engine 114 may validate that the one or more media segments associated with the stream identifier are eligible for the playout, and further validate that the one or more media segments associated with the stream identifier are eligible in accordance with the fourth playout buffer feature enabled via the one or more constraints and rights. Accordingly, the stream publishing engine 114 may set the default playout buffer duration for the one or more media segments and proceed to insert the manifest data and indexed metadata of one or more media segments associated with the stream identifier to the first disparate live media output stream manifest in accordance with the default playout buffer duration.

In accordance with another embodiment, when the stream publishing engine 114 fails to validate that the one or more media segments associated with the stream identifier are eligible in accordance with the fourth playout buffer feature, the stream publishing engine 114 may further check the additional parameter. In accordance with a first exemplary scenario, when the one or more media segments associated with the stream identifier are eligible in accordance with the fourth playout buffer feature and at least the additional parameter comprises both of the user identifier and the altered playout buffer duration flag, the stream publishing engine 114 may query the repository of schedules, rights, and preferences database 144 based on the user identifier. Accordingly, the stream publishing engine 114 may receive a permissible playout buffer duration, set the playout buffer duration according to the received permissible playout buffer duration, and proceed to insert the manifest data and indexed metadata of one or more media segments associated with the stream identifier to the first disparate live media output stream manifest in accordance with the playout buffer duration according to the received permissible playout buffer duration. In accordance with a second exemplary scenario, when the one or more media segments associated with the stream identifier are eligible in accordance with the fourth playout buffer feature and at least the additional parameter comprises a desired playout buffer duration for the one or more media segments associated with the stream identifier, the stream publishing engine 114 may set the playout buffer duration for the one or more media segments based on the desired playout buffer duration. When the desired playout buffer duration exceeds the maximum playout buffer duration, the stream publishing engine 114 may set the playout buffer duration for the one or more media segments in accordance with the second playout buffer feature, and proceed to insert the manifest data and indexed metadata of one or more media segments associated with the stream identifier to the first disparate live media output stream manifest in accordance with the second playout buffer feature. When the desired playout buffer duration fails to exceed the maximum playout buffer duration, the stream publishing engine 114 may proceed to insert the manifest data and indexed metadata of one or more media segments associated with the stream identifier to the first disparate live media output stream manifest in accordance with the playout buffer duration based on the desired playout buffer duration. In accordance with a third exemplary scenario, when the one or more media segments associated with the stream identifier are eligible for the playout and the additional parameter does not comprise the altered playout buffer duration flag or the desired playout buffer duration, the stream publishing engine 114 may proceed to insert the manifest data and indexed metadata of one or more media segments associated with the stream identifier to the first disparate live media output stream manifest in accordance with the default live window duration.

Once the manifest data and indexed metadata of one or more media segments associated with the stream identifier is inserted to the first disparate live media output stream manifest in accordance with the one or more playout buffer features and at least the additional parameter, as described above in accordance with the various embodiments and exemplary scenarios, the stream publishing engine 114 may generate the first disparate live media output stream based on one of a pre-defined conversion modes. The pre-defined conversion modes may correspond to pre-encoded media assets to live stream mode, pre-encoded media assets to live stream mode with scalable architecture, a live stream to live stream mode, and a mixed mode corresponding to switching between pre-encoded media assets and live streams. The stream publishing engine 114 may further playout the generated first disparate live media output stream to be viewed at one or more of the client devices 132a, . . . , 132n.

Figure 2:
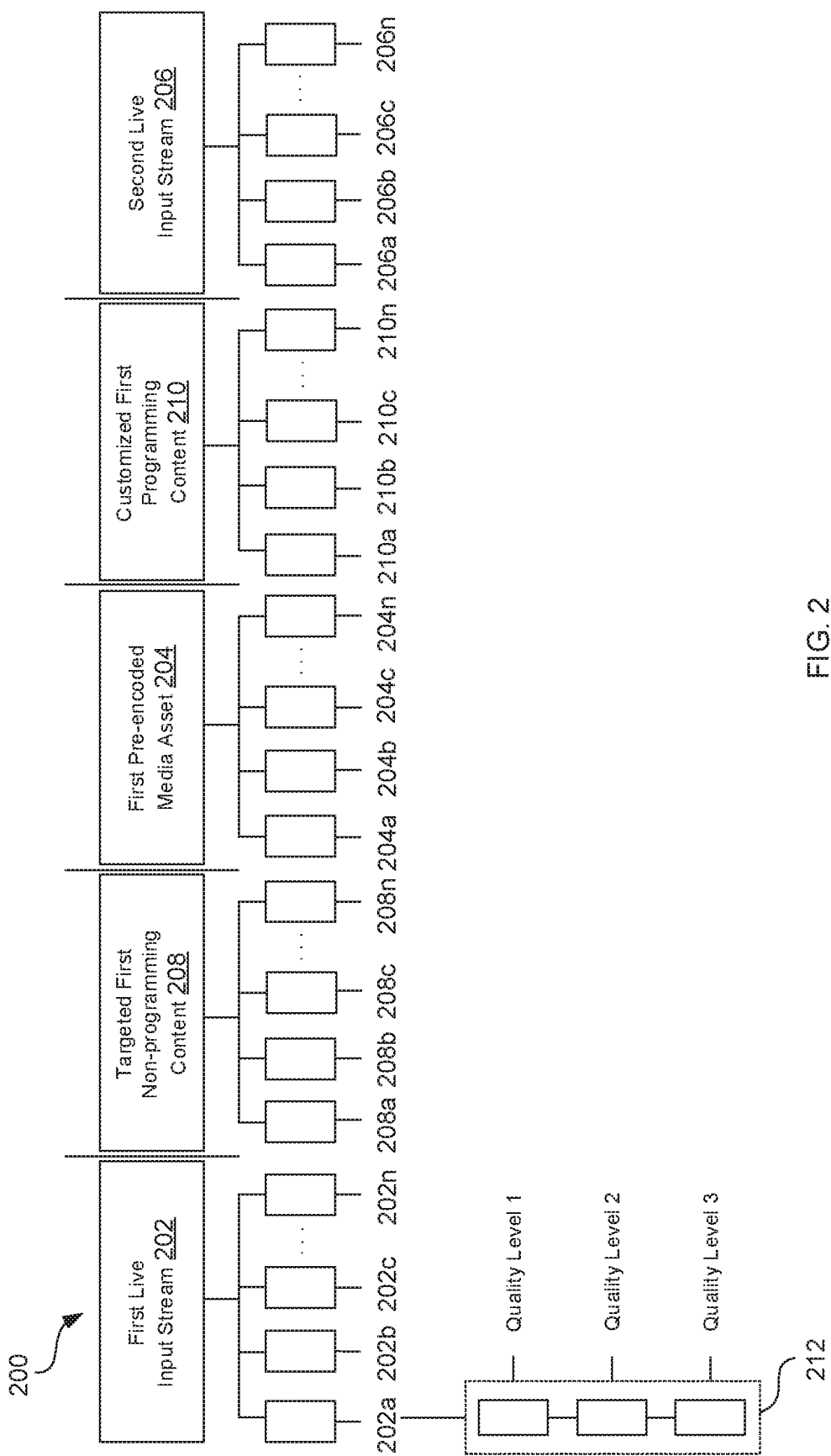
FIG. 2 illustrates segmentation of live input streams and pre-encoded media assets for a first programming schedule for publishing a disparate per-client live media output stream based on dynamic insertion of targeted non-programming content and customized programming content by the DACIS of FIG. 1B, and for providing a dynamic playout buffer for a disparate live media output stream, in accordance with exemplary embodiments of the disclosure.

FIG. 2 illustrates segmentation of live input streams and pre-encoded media assets for the first programming schedule 111 or the alternate programming schedule 113 for publishing a disparate per-client live media output stream based on dynamic insertion of targeted non-programming content and customized programming content by the DACIS 103 of FIG. 1B, and for providing a dynamic playout buffer for disparate live media output stream, in accordance with exemplary embodiments of the disclosure. Referring to the exemplary arrangement of FIG. 2, there is shown a first live input stream 202, a first pre-encoded media asset 204, and a second live input stream 206. There is also shown a targeted first non-programming content 208 placed after the first live input stream 202, and a customized first programming content 210 placed after the first pre-encoded media asset 204. The first live input stream 202 may be segmented into a first set of video segments 202a, 202b, 202c, . . . , 202n. Similarly, the first pre-encoded media asset 204 and the second live input stream 206 may also be segmented into second set of video segments 204a, 204b, 204c, . . . , 204n, and third set of video segments 206a, 206b, 206c, . . . , 206n respectively. By way of example, the segmentation may be executed by a segmenting system (for example a live stream encoder/packager and/or a content encoder/packager (not shown)) during a preparation stage of the media assets. The encode stage may create various quality levels and the package stage segments the content into the short segments, and produces the correct format, such as TS, fMP4, or CMAF and encrypts the media content to prevent piracy. In accordance with an embodiment, the segments of the first set of video segments 202a, 202b, 202c, . . . , 202n, the second set of video segments 204a, 204b, 204c, . . . , 204n, and third set of video segments 206a, 206b, 206c, . . . , 206n, may be segmented into consistent length, for example, 10 seconds segments. It may be advantageous to have a consistent and smaller file size of segments to be able to quickly push to the content delivery system 130, and also for quick downloading by a media player at the end-user side, such as on the plurality of consumer devices 110a, . . . , 110n.

It should be understood by those skilled in the art that various changes may be made and segments of different file sizes (or length) may be used without departure from the scope of the present disclosure. Further, other streaming protocols may require a different processing of media content. Thus, the scope of the disclosure should not be limited to the processing or preparation of media content to allow delivery using different delivery methods, streaming protocols, or distribution system, known in the art. Further, instead of the live input streams and pre-encoded media asset arranged, as shown, different arrangements per the first programming schedule 111 or the alternate programming schedule 113 may be possible with respect to interstitial content items, such as the targeted first non-programming content 208 and the customized first programming content 210.

The insertion of the live input stream manifests, pre-encoded media asset manifests, the targeted first non-programming content 208 and the customized first programming content 210 may be done on-the-fly based on dynamic scheduling by the PEM 115 that generates the first programming schedule 111 or the alternate programming schedule 113. The insertion may be driven by real time or near-real time content context analysis, user-selection on the consumer devices 110a, . . . , 110n, or driven by external data received from the external data source 120. The PEM 115 in association with the stream selection service 142 may be configured to insert live input streams, such as the first live input stream 202 and the second live input stream 206, or pre-stored media assets, such as the first pre-encoded media asset 204, the targeted first non-programming content 208 and the customized first programming content 210, in an existing disparate live media output stream based on manipulation of a manifest the existing disparate live media output stream, such as an existing channel.

In accordance with an embodiment, each segment of the first set of video segments 202a, 202b, 202c, . . . , 202n, the second set of video segments 204a, 204b, 204c, . . . , 204n, and third set of video segments 206a, 206b, 206c, . . . , 206n, may be further processed to be stored at various quality levels, and content encryption modes for the purposes of adaptive bitrate streaming and digital rights management, for example, the video segment 202a may be stored in a plurality of quality levels, for example, high definition (HD), high dynamic range (HDR) video, or different quality levels in accordance with specified pixel resolutions, bitrates, frame rates, and/or sample frequencies. As each of the media content, such as 202 to 206, are encoded, segmented, and stored with the plurality of quality levels in a media content master storage system. The media content may be re-used to create new channels, such as a new disparate live media output stream, without having to re-encode a selected live input stream or a pre-encoded media asset when a new disparate live media output stream is created using the live input streams or a pre-encoded media asset.

For the sake of brevity, and with reference to FIG. 2, there is shown an example of publishing the first or the updated (or alternate) disparate live media output streams based on dynamic insertion of targeted non-programming content and customized programming content by the DACIS 103 of FIG. 1B. It is to be understood that media packaging for different delivery methods (such as analog terrestrial broadcast, digital terrestrial broadcast, direct-to-home satellite broadcast, cable, other Internet Protocol (IP)-based delivery methods, over-the-top television (OTT)), different streaming protocols, or distribution system, may be different. The media content may be prepared to be viewed one or more of the plurality of consumer devices 110a, . . . , 110n, based on at least the desired delivery method, delivery conditions, content protection requirements, to satisfy operational and technical requirements, as needed. The operational and technical requirements may include, but are not limited to, media encoding, media segmentation, programming schedule (or manifest) creation or manipulation requirements, desired media encryption, and/or metadata signaling requirements. For example, in certain scenarios and for certain media content delivery methods, network bandwidth, network conditions, or device-type where media content is to be consumed may not be variable or known in advance. In such a case, creating different quality levels for same media content may not be required. Further, based on different operational and technical requirements, publishing of disparate live media output stream may be different. The media content that is prepared and distributed may include both the programming content, such as long-form presentations, short-form presentations, news or sporting events; and non-programming content, such as paid advertisements, public service advertisements, or promotional material.

Figure 3:
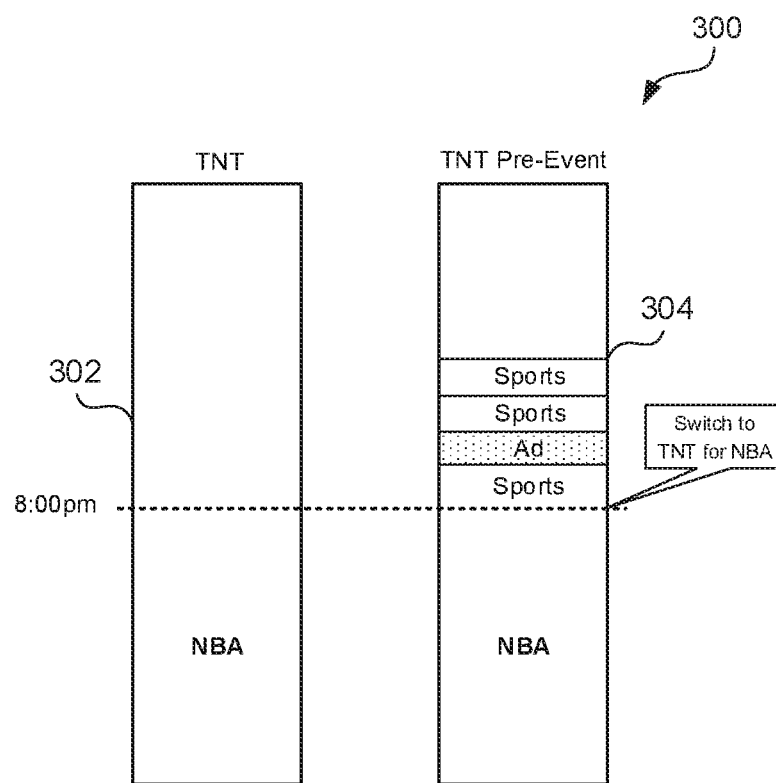
FIG. 3 illustrates an exemplary scenario associated with publishing a disparate live media output stream by the DACIS of FIG. 1B, in accordance with an exemplary embodiment of the disclosure.

FIG. 3 illustrates an exemplary scenario associated with publishing a disparate live media output stream by the DACIS 103 of FIG. 1B, in accordance with an exemplary embodiment of the disclosure. Referring to the exemplary scenario 300, there are illustrated two disparate live media output streams 302 and 304 published for two users associated with the client devices 132a and 132n, respectively. The disparate live media output stream 302 may be existing disparate live media output stream for the client device 132a. The disparate live media output stream 304 may be a disparate per-client live media output stream published based on dynamic insertion of targeted non-programming content and customized programming content by the DACIS 103 of FIG. 1B for the client device 132n.

The live NBA game may be scheduled to start at 8:00 pm. However, a user associated with the client device 132n tunes in early to watch the NBA game, for example at 7:15 pm. However, the user may not be interested in watching the end of the current programming media content. In such a case, the PEM 115 in the DACIS 103 may determine targeted non-programming content, such as sports items ads, and customized programming content, such as NBA highlights of previous game and generates the alternate programming schedule 113. Accordingly, the stream publishing engine 114 in the DACIS 103 may publish an alternate disparate live media output stream 117n for the client device 132n. At 8:00 pm, the DACIS 103 may switch back to the live NBA game scheduled at 8:00 pm.

FIGS. 4A to 4D depict flowcharts illustrating exemplary operations for publishing a disparate per-client live media output stream based on dynamic insertion of targeted non-programming content and customized programming content in the media packaging and distribution system 102 of FIG. 1B, in accordance with an exemplary embodiment of the disclosure. Specifically, flowcharts 400A and 400B collectively depicts a method for just-in-time insertion of non-programming content and/or programming content, in accordance with an embodiment of the disclosure. Flowchart 400C depicts a method for personalized insertion of non-programming content and/or programming content, in accordance with an embodiment of the disclosure. Flowchart 400E depicts a method for stream failover, in accordance with an embodiment of the disclosure.

Figure 4A:
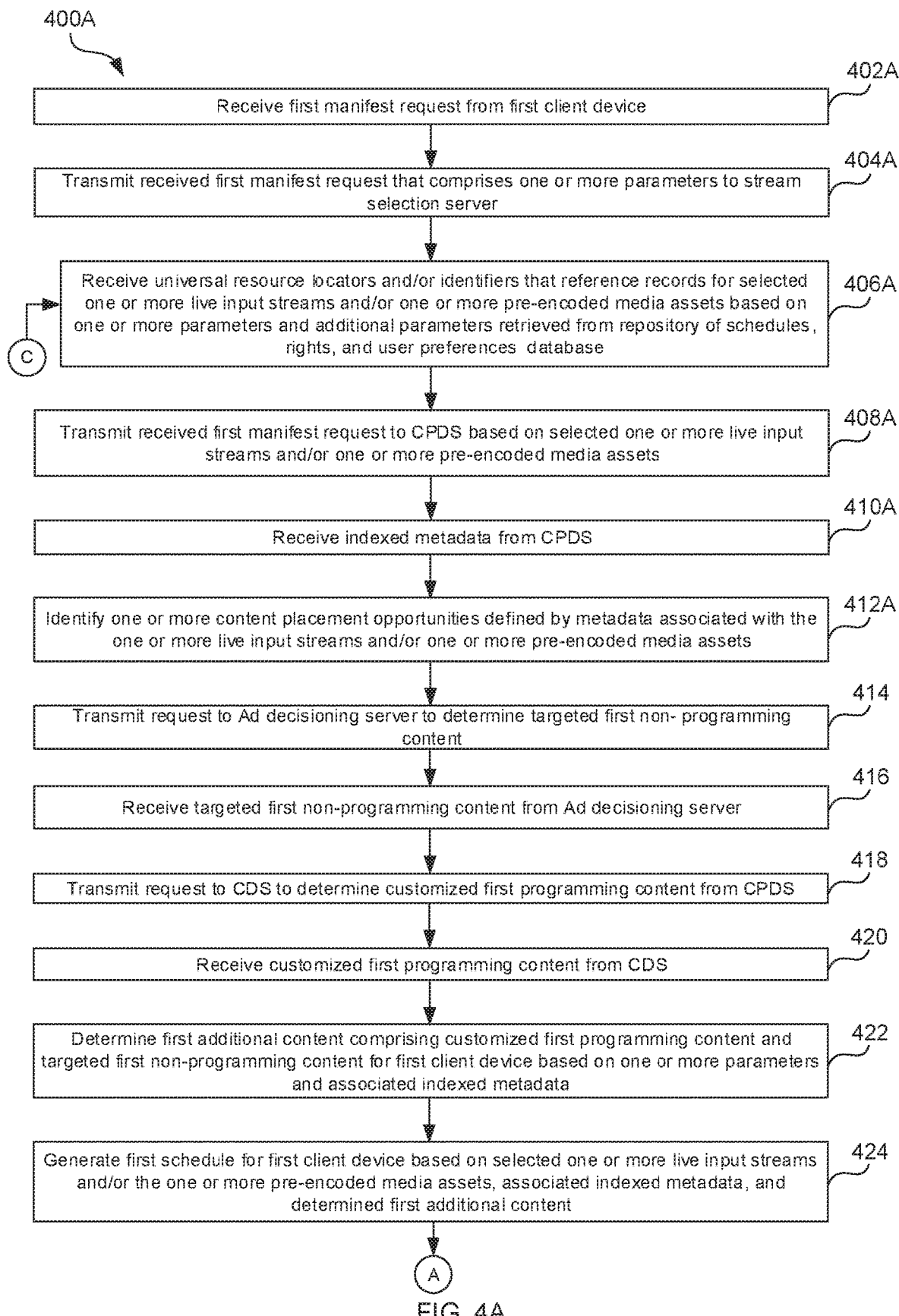
FIGS. 4A to 4D collectively depict a flowchart illustrating exemplary operations for publishing a disparate per-client live media output stream based on dynamic insertion of targeted non-programming content and customized programming content by the DACIS of FIG. 1B, in accordance with an exemplary embodiment of the disclosure.
Figure 4B:
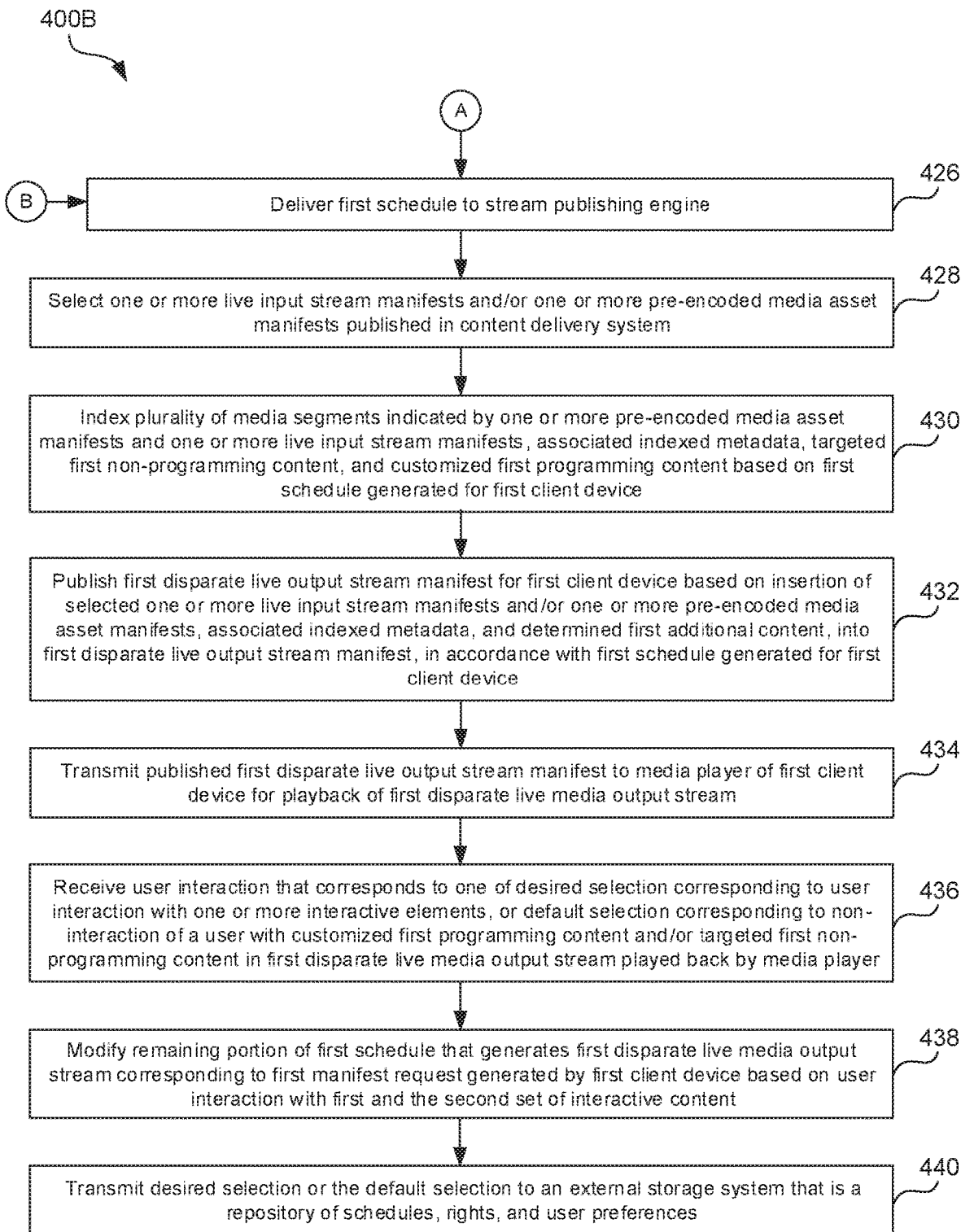

Referring to FIGS. 4A and 4B, flowcharts 400A and 400B collectively depicts a method for just-in-time insertion of non-programming content and/or programming content, in accordance with an embodiment of the disclosure.

At 402A, a first manifest request may be received from a first client device. In accordance with an embodiment, the DACIS 103 may be configured to receive the first manifest request from the first client device, such as a client device 132a, to begin or continue playback of a first disparate live media output stream, for example the disparate live media output stream 117a. The first manifest request may comprise one or more parameters. Examples of the one or more parameters may include, but are not limited to, universal resource locators and/or identifiers referencing records for existing one or more live input streams or one or more pre-encoded media assets in the CPDS 107, a plurality of client-specific parameters, and a plurality of client-specified attributes derived from a user interaction with the first client device, such as the client device 132a. Examples of the plurality of client-specific parameters may include, but are not limited to, user preferences and identifiers, client device preferences and identifiers, and one or more rules governed by geolocation data and current position of playback of a first disparate live media output stream, such as the disparate live media output stream 117a, at the first client device, such as the client device 132a. In an embodiment, the client-specified attributes derived from a user interaction with the first client device may include, but are not limited to, the user interaction with interactive content in a customized first programming content and a targeted first non-programming content, and a preference for a type and/or category of the targeted first non-programming content and/or the customized first programming content. The user interaction with the interactive content may comprise, for example, a selection to exclude the targeted first non-programming content and/or the customized first programming content, a selection to include a subset of the targeted first non-programming content and/or the customized first programming content, and a selection to include all of the targeted first non-programming content and/or the customized first programming content within one or more specified non-programming content locations.

At 404A, the received first manifest request that comprises one or more parameters may be transmitted to the stream selection service 142. In an embodiment, the PEM 115 of the DACIS 103 may be configured to transmit the received first manifest request that comprises the one or more parameters to the stream selection service 142.

In an embodiment, based on the received first manifest request, the stream selection service 142 may be configured to select one or more live input streams and/or one or more pre-encoded media assets based on the one or more parameters and additional parameters retrieved from the repository of schedules, rights, and user preferences database 144. Accordingly, the stream selection service 142 may be configured to return universal resource locators and/or identifiers that reference records for the selected one or more live input streams and/or one or more pre-encoded media assets to the PEM 115.

At 406A, the universal resource locators and/or identifiers that reference records for the selected one or more live input streams and/or one or more pre-encoded media assets based on the one or more parameters and additional parameters retrieved from the repository of schedules, rights, and user preferences database 144 may be received. In an embodiment, the PEM 115 of the DACIS 103 may be configured to receive the universal resource locators and/or identifiers that reference records for the selected one or more live input streams and/or one or more pre-encoded media assets based on the one or more parameters and additional parameters retrieved from the repository of schedules, rights, and user preferences database 144.

At 408A, the received first manifest request may be transmitted to the CPDS 107 based on the selected one or more live input streams and/or one or more pre-encoded media assets. In an embodiment, the PEM 115 of the DACIS 103 may be configured to transmit the received first manifest request to the CPDS 107 based on the selected one or more live input streams and/or one or more pre-encoded media assets.

In an embodiment, based on the received first manifest request, the CPDS 107 may be configured to retrieve indexed metadata, for example, non-programming indicators, such as ad break locations, graphical treatment indicators, such as overlay markers/triggers, programming indictors, such as SCTE35 markers and content duration. Accordingly, the CPDS 107 may be configured to return the indexed metadata to the PEM 115.

At 410A, the indexed metadata may be received from the CPDS 107. In an embodiment, the PEM 115 of the DACIS 103 may be configured to receive the indexed metadata from the CPDS 107. Examples of the indexed metadata may include, but are not limited to, non-programming indicators, such as ad break locations, graphical treatment indicators, such as overlay markers/triggers, programming indictors, such as SCTE35 markers and content duration, as described above.

At 412A, one or more content placement opportunities defined by the metadata associated with the one or more live input streams and/or one or more pre-encoded media assets may be identified. In an embodiment, the PEM 115 of the DACIS 103 may be configured to identify the one or more content placement opportunities defined by the metadata associated with the one or more live input streams and/or one or more pre-encoded media assets. Examples of the one or more content placement opportunities may include, but are not limited to, non-programming indicators, such as ad break locations, graphical treatment indicators, such as overlay markers/triggers, programming indictors, such as SCTE35 markers and personalized content opportunity. In an embodiment, for the identified one or more content placement opportunities, the PEM 115 of the DACIS 103 may be configured to determine additional content, such as non-programming content (such as advertisements), personalized programming content (such as promotional content), graphical treatment (such as overlays), and one or more decision point locations.

At 414, a request may be transmitted to the Ad decisioning server 106a to determine targeted first non-programming content. In an embodiment, the PEM 115 of the DACIS 103 may be configured to transmit the request to the Ad decisioning server 106a to determine the targeted first non-programming content.

In an embodiment, based on the request, the Ad decisioning server 106a may be configured to identify the targeted first non-programming content, such as an advertising or a graphical treatment content, to be scheduled in one or more content placement opportunities, based on the one or more parameters. In an embodiment, the Ad decisioning server 106a may be configured to identify the targeted first non-programming content based on execution of a non-programming content service based on rules and conditions defined in additional parameters of the repository of schedules, rights, and user preferences database 144, and the one or more parameters defined in the first manifest request. Accordingly, the Ad decisioning server 106a may be configured to transmit the identified targeted first non-programming content to the PEM 115 of the DACIS 103.

At 416, the targeted first non-programming content may be received from the Ad decisioning server 106a. In an embodiment, the PEM 115 of the DACIS 103 may be configured to receive the targeted first non-programming content from the Ad decisioning server 106a.

At 418, a request may be transmitted to the CDS 105 to determine a customized first programming content to match one or more personalization parameters. In an embodiment, the PEM 115 of the DACIS 103 may be configured to transmit the request to the CDS 105. The CDS 105 may determine a customized first programming content to match one or more personalization parameters.

In an embodiment, based on the request, the CDS 105 may be configured to identify the customized first programming content based on the one or more parameters in the first manifest request, and the rules and conditions defined in the additional parameters of the repository of schedules, rights, and user preferences database 144. Accordingly, the CDS 105 may be configured to transmit the identified customized first programming content to the PEM 115 of the DACIS 103.

At 420, the customized first programming content may be received from the CDS 105. In an embodiment, the PEM 115 of the DACIS 103 may be configured to receive the customized first programming content from the CDS 105.

At 422, a first additional content comprising the customized first programming content and the targeted first non-programming content may be determined for the first client device based on the one or more parameters and the associated indexed metadata. In an embodiment, the PEM 115 of the DACIS 103 may be configured to determine the first additional content comprising the customized first programming content, received from the CDS 105, and the targeted first non-programming content, received from the Ad decisioning server 106a. The first additional content may be determined for the first client device, such as the client device 132a, based on the one or more parameters and the associated indexed metadata, received from the CPDS 107.

At 424, a first programming schedule 111 may be generated for the first client device based on the selected one or more live input streams and/or the one or more pre-encoded media assets, the associated indexed metadata, and the determined first additional content. In an embodiment, the PEM 115 of the DACIS 103 may be configured to generate the first programming schedule 111 for the first client device, such as the client device 132a, based on selected one or more live input streams and/or the one or more pre-encoded media assets, the associated indexed metadata, and the determined first additional content.

In accordance with an embodiment, the generated first programming schedule 111 may not include the first additional content, in accordance with the one or more parameters in the first manifest request. In accordance with another embodiment, the generated first programming schedule 111 may include the first additional content, in accordance with the one or more parameters in the first manifest request. In accordance with another embodiment, the generated first programming schedule 111 may include a subset of the first additional content, in accordance with the one or more parameters in the first manifest request.

In accordance with an embodiment, the first additional content scheduled to be inserted, may be inserted into, for example, one or more pre-encoded assets in accordance with appropriate markers. The appropriate markers may be defined in the metadata of the one or more pre-encoded assets, and rules and conditions defined in the repository of schedule, rights, and user preferences database 144.

In accordance with an embodiment, the generated first programming schedule 111 may define locations and types of one or more decision points defined by the one or more content placement opportunities in the indexed metadata. The one or more decision points may be included in the first programming schedule 111. Within the first programming schedule 111, the one or more decision points may define various types of the decision points, for example, an Ad preference, skip next ad, skip future ads, watch ads immediately instead of at future ad locations, or personalized content preferences.

In an exemplary embodiment, the one or more pre-encoded media assets are scheduled and the one or more decision points, defined by the one or more content placement opportunities, are inserted in the first programming schedule 111. In such exemplary embodiment, the first programming schedule 111 may be configured to control the one or more pre-encoded media asset manifests to be published as, for example, the first disparate live media output stream manifest. Further, the first programming schedule 111 may include, for example, segments, markers, the one or more content placement opportunities, up to and including next available decision point.

At 426, the first programming schedule 111 may be delivered to the stream publishing engine 114. In accordance with an embodiment, the PEM 115 in the DACIS 103 may be configured to deliver the first programming schedule 111 to the stream publishing engine 114.

At 428, one or more live input stream manifests and/or one or more pre-encoded media asset manifests published in the content delivery system 130 may be selected. In accordance with an embodiment, the stream publishing engine 114 in the DACIS 103 may be configured to select the one or more live input stream manifests and/or the one or more pre-encoded media asset manifests published in the content delivery system 130.

At 430, a plurality of media segments indicated by the one or more pre-encoded media asset manifests and the one or more live input stream manifests, the associated indexed metadata, the targeted first non-programming content, and the customized first programming content may be indexed based on the first programming schedule 111 generated for the first client device. In accordance with an embodiment, the indexing and storage system 116 may be configured to index the plurality of media segments indicated by the one or more pre-encoded media asset manifests and the one or more live input stream manifests, the associated indexed metadata, the targeted first non-programming content, and the customized first programming content may be indexed based on the first programming schedule 111 generated for the first client device, for example the client device 132*a*.

At 432, a first disparate live media output stream manifest for the first client device may be published based on insertion of the selected one or more live input stream manifests and/or the one or more pre-encoded media asset manifests, the associated indexed metadata, and the determined first additional content, into the first disparate live media output stream manifest, in accordance with the first programming schedule 111 generated for the first client device. In accordance with an embodiment, the stream publishing engine 114 in the DACIS 103 may be configured to publish the first disparate live media output stream manifest for the first client device, for example the client device 132*a*. The publication may be based on insertion of the selected one or more live input stream manifests and/or the one or more pre-encoded media asset manifests, the associated indexed metadata, and the determined first additional content, into the first disparate live media output stream manifest, in accordance with the first programming schedule 111 generated for the first client device, for example the client device 132*a*.

At 434, the published first disparate live media output stream manifest may be transmitted to a media player of the first client device for playback of the first disparate live media output stream, for example the disparate live media output stream 117*a*. In accordance with an embodiment, the DACIS 103 may be configured to transmit the published first disparate live media output stream manifest to the media player of the first client device for playback of the first disparate live media output stream, for example the disparate live media output stream 117*a*. In accordance with an embodiment, the first disparate live media output stream manifest for the first client device, for example the client device 132*a*, may be generated based on one of a pre-defined conversion modes. The pre-defined conversion modes may correspond to conversion of pre-encoded media assets to live stream mode, pre-encoded media assets to live stream mode with scalable architecture, a live stream to live stream mode, and a mixed mode corresponding to switches between pre-encoded media assets and live streams.

In accordance with an embodiment, the published first disparate live media output stream manifest may be delivered to the first client device, for example the client device 132*a*. Accordingly, the media player of the first client device, for example the client device 132*a*, may begin or continue playback of the first disparate live media output stream 117*a*. Further, the media player, during playback of the first disparate live media output stream 117*a* at the first client device, for example the client device 132*a*, presents one or more decision points defined by the interactive content to initiate a user interaction at the first client device, for example the client device 132*a*.

In accordance with an embodiment, during the playback, in case a decision point exists, is enabled, and presented by the first client device, for example the client device 132*a*, the user of the client device 132*a* may interact with one or more interactive elements at the decision point and influence (or modify) remaining first disparate live media output stream 117*a*.

For example, in an embodiment of just-in-time non-programming content insertion, at the one or more decision points, the user interaction corresponds to one of a desired selection corresponding to the user interaction with one or more interactive elements, or a default selection corresponding to non-interaction of a user with the customized first programming content and/or the targeted first non-programming content in the first disparate live media output stream 117*a* played back by the media player. In another example, in an embodiment of personalized content playlist, at the one or more decision points, the user interaction corresponds to one of exclusion of the targeted first non-programming content or the customized first programming content and replacement by default content, selection of alternate customized first programming content, selection of a subsequent second programming content, approval or disapproval of the selected customized first programming content, exclusion of subsequent second non-programming content for a remaining portion of the first disparate live media output stream 117*a* played back by the media player, selection of one or more targeted first non-programming content of a specific category, or viewing of some or all of the targeted first non-programming content immediately to avoid some or all of the targeted first non-programming content for the remaining portion of the first disparate live media output stream played back by the media player.

At 436, the user interaction may be received that corresponds to one of a desired selection corresponding to the user interaction with one or more interactive elements, or a default selection corresponding to a non-interaction of the user with the customized first programming content and/or the targeted first non-programming content in the first disparate live media output stream 117*a* played back by the media player. In accordance with an embodiment, the PEM 115 of the DACIS 103 may be configured to receive the user interaction may be received. The user interaction may correspond to one of a desired selection corresponding to the user interaction with one or more interactive elements, or a default selection corresponding to a non-interaction of the user with the customized first programming content and/or the targeted first non-programming content in the first disparate live media output stream 117*a* played back by the media player.

At 438, a remaining portion of the first programming schedule 111 that generates the first disparate live media output stream 117*a* corresponding to the first manifest request generated by the first client device, such as the client device 132*a*, may be modified based on the user interaction with the interactive content. In accordance with an embodiment, the PEM 115 of the DACIS 103 may be configured to modify the remaining portion of the first programming schedule 111 that generates the first disparate live media output stream 117*a* corresponding to the first manifest request generated by the first client device, such as the client device 132*a*, based on the user interaction with the interactive content.

At 440, a desired selection or the default selection may be transmitted to an external storage system that is the repository of schedules, rights, and user preferences database 144. In accordance with an embodiment, the first client device, for example the client device 132a, may be configured to transmit the desired selection or the default selection to the external storage system that is the repository of schedules, rights, and user preferences database 144.

In accordance with an embodiment, the user interaction or non-interaction result may be sent to future client manifest requests to influence the remainder of the first disparate live media output stream 117a. This may allow for a user choice, such as to skip an ad, to result with another manifest request to the DACIS 103 to update the existing first disparate live media output stream 117a with the intended behavior and affect playback of the first disparate live media output stream 117a within the first client device.

Figure 4C:
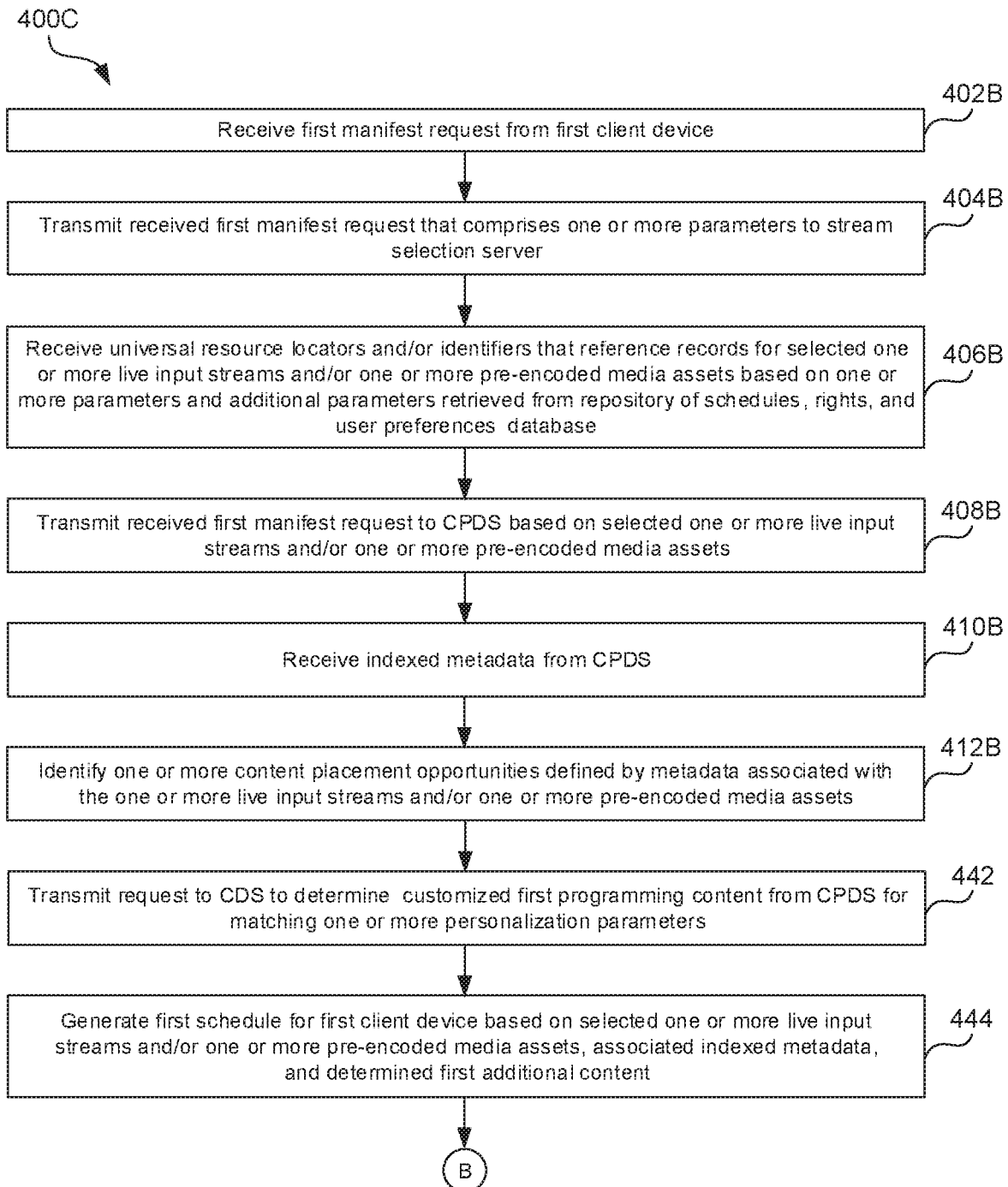

Referring to FIG. 4C, flowchart 400C depicts a method for personalized insertion of playlist of non-programming content and/or programming content, in accordance with an embodiment of the disclosure.

At 402B, a first manifest request may be received from a first client device. In accordance with an embodiment, the DACIS 103 may be configured to receive the first manifest request from the first client device, such as a client device 132a, to begin or continue playback of a first disparate live media output stream, for example the disparate live media output stream 117a. The first manifest request may comprise one or more parameters. Examples of the one or more parameters may include, but are not limited to, universal resource locators and/or identifiers referencing records for existing one or more live input streams or one or more pre-encoded media assets in the CPDS 107, a plurality of client-specific parameters, and a plurality of client-specified attributes derived from a user interaction with the first client device, such as the client device 132a. Examples of the plurality of client-specific parameters may include, but are not limited to, user preferences and identifiers, client device preferences and identifiers, and one or more rules governed by geolocation data and current position of playback of a first disparate live media output stream, such as the disparate live media output stream 117a, at the first client device, such as the client device 132a. In another embodiment, the client-specified attributes derived from a user interaction with the first client device may include, but are not limited to, a preference for a type and/or category of the targeted first non-programming content and/or the customized first programming content, and a possible time constraint (or duration) to fill with the targeted first non-programming content and/or the customized first programming content. The user interaction with the interactive content may comprise, for example, a selection to exclude the targeted first non-programming content and/or the customized first programming content, a selection to include a subset of the targeted first non-programming content and/or the customized first programming content, and a selection to include all of the targeted first non-programming content and/or the customized first programming content within one or more specified non-programming content locations.

The user interaction with the interactive content may comprise, for example, a selection to exclude the targeted first non-programming content and/or the customized first programming content, a selection to include a subset of the targeted first non-programming content and/or the customized first programming content, and a selection to include all of the targeted first non-programming content and/or the customized first programming content within one or more specified non-programming content locations.

At 404B, the received first manifest request that comprises one or more parameters may be transmitted to the stream selection service 142. In an embodiment, the PEM 115 of the DACIS 103 may be configured to transmit the received first manifest request that comprises the one or more parameters to the stream selection service 142.

In an embodiment, based on the received first manifest request, the stream selection service 142 may be configured to select one or more live input streams and/or one or more pre-encoded media assets based on the one or more parameters and additional parameters retrieved from the repository of schedules, rights, and user preferences database 144. Accordingly, the stream selection service 142 may be configured to return universal resource locators and/or identifiers that reference records for the selected one or more live input streams and/or one or more pre-encoded media assets to the PEM 115.

At 406B, the universal resource locators and/or identifiers that reference records for the selected one or more live input streams and/or one or more pre-encoded media assets based on the one or more parameters and additional parameters retrieved from the repository of schedules, rights, and user preferences database 144 may be received. In an embodiment, the PEM 115 of the DACIS 103 may be configured to receive the universal resource locators and/or identifiers that reference records for the selected one or more live input streams and/or one or more pre-encoded media assets based on the one or more parameters and additional parameters retrieved from the repository of schedules, rights, and user preferences database 144.

At 408B, the received first manifest request may be transmitted to the CPDS 107 based on the selected one or more live input streams and/or one or more pre-encoded media assets. In an embodiment, the PEM 115 of the DACIS 103 may be configured to transmit the received first manifest request to the CPDS 107 based on the selected one or more live input streams and/or one or more pre-encoded media assets.

In an embodiment, based on the received request, the CPDS 107 may be configured to retrieve indexed metadata, for example, non-programming indicators, such as ad break locations, graphical treatment indicators, such as overlay markers/triggers, programming indictors, such as SCTE35 markers, content duration, and categories (such as, "basketball", "sports", "Knicks") to which the programming content has been assigned.

At 410B, the indexed metadata may be received from the CPDS 107. In an embodiment, the PEM 115 of the DACIS 103 may be configured to receive the indexed metadata from the CPDS 107. Examples of the indexed metadata may include, but are not limited to, non-programming indicators, such as ad break locations, graphical treatment indicators, such as overlay markers/triggers, programming indictors, such as SCTE35 markers and content duration, as described above.

At 412B, one or more content placement opportunities defined by the metadata associated with the one or more live input streams and/or one or more pre-encoded media assets may be identified. In an embodiment, the PEM 115 of the DACIS 103 may be configured to identify the one or more content placement opportunities defined by the metadata associated with the one or more live input streams and/or one or more pre-encoded media assets. Examples of the one or more content placement opportunities may include, but are not limited to, non-programming indicators, such as ad break locations, graphical treatment indicators, such as overlay markers/triggers, programming indictors, such as SCTE35 markers and personalized content opportunity. In an embodiment, for the identified one or more content placement opportunities, the PEM 115 of the DACIS 103 may be configured to determine additional content, such as non-programming content (such as advertisements), personalized programming content (such as promotional content), graphical treatment (such as overlays), and one or more decision point locations.

At 442, a request may be transmitted to the CDS 105 to determine a customized first programming content from the CPDS 107 for matching one or more personalization parameters. In accordance with an embodiment, the PEM 115 of the DACIS 103 may be configured to transmit a request to the CDS 105 to determine the customized first programming content from the CPDS 107 for matching one or more personalization parameters. Examples of the one or more personalization parameters may include, but are not limited to, user preferences and identifiers from the first manifest request or retrieved from the repository of schedules, rights, and user preferences database 144, and time constraints. The time constraints may be determined based on user preferences retrieved from the repository of schedules, rights, and user preferences database 144, a range defined in the first manifest request, and schedule tolerances defined in the repository of schedules, rights, and user preferences database 144, client device preferences or identifiers from the first manifest request or retrieved from the repository of schedules, rights, and user preferences database 144, geolocation information from the first manifest request or retrieved from the repository of schedules, rights, and user preferences database 144, and/or a content recommendation engine.

At 444, the first programming schedule 111 may be generated for the first client device based on the selected one or more live input streams and/or the one or more pre-encoded media assets, the associated indexed metadata, and the determined first additional content. In accordance with an embodiment, the PEM 115 of the DACIS 103 may be configured to generate the first programming schedule 111 for the first client device, such as the client device 132a, based on the selected one or more live input streams and/or the one or more pre-encoded media assets, the associated indexed metadata, and the determined first additional content.

In accordance with an embodiment, the first additional content scheduled to be inserted, may be inserted into, for example, one or more pre-encoded assets in accordance with appropriate markers. The appropriate markers may be defined in the metadata of the one or more pre-encoded assets, and rules and conditions defined in the repository of schedule, rights, and user preferences database 144.

In accordance with an embodiment, the generated first programming schedule 111 may define locations and types of one or more decision points defined by the one or more content placement opportunities in the indexed metadata. Such one or more decision points may be included in the first programming schedule 111. Within the first programming schedule 111, the one or more decision points may define personalized content preferences, skipping of personalized content and moving to default content, and approval or disapproval of the personalized content.

In an exemplary embodiment, the one or more pre-encoded media assets are scheduled and the one or more decision points, defined by the one or more content placement opportunities, are inserted in the first programming schedule 111. In such exemplary embodiment, the first programming schedule 111 may be configured to control the one or more pre-encoded media asset manifests to be published as, for example, the first disparate live media output stream manifest. Further, the first programming schedule 111 may include, for example, segments, markers, the one or more content placement opportunities, up to and including next available decision point. Thereafter, control passes to 426 in flowchart 400B and exemplary operations till 440 may be performed in similar manner as described above.

Figure 4D:
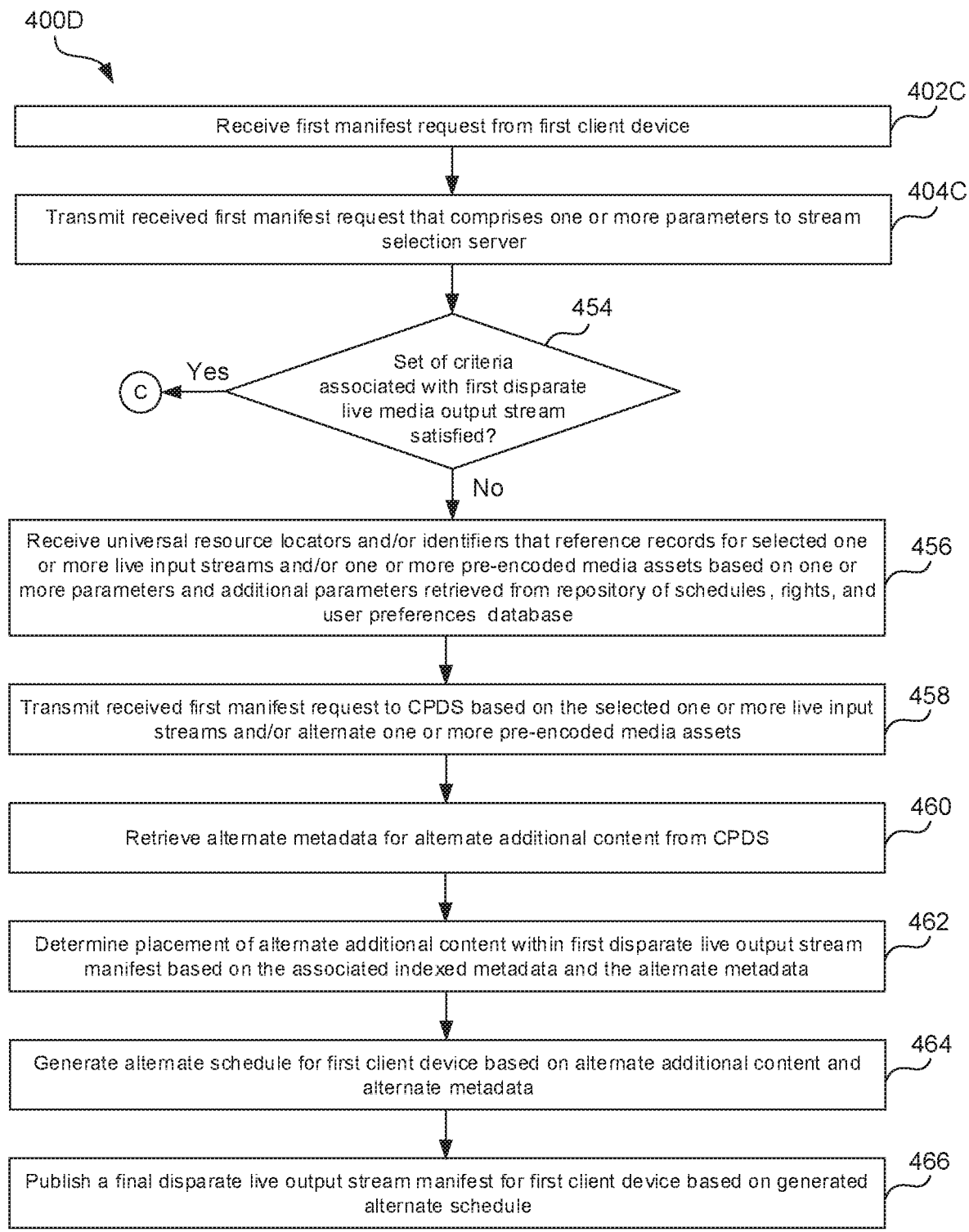

Referring to FIG. 4D, there is illustrated a flowchart 400D depicting a method for stream failover, in accordance with an embodiment of the disclosure.

At 402C, a first manifest request may be received from a first client device. In accordance with an embodiment, the DACIS 103 may be configured to receive the first manifest request from the first client device, such as a client device 132a, to begin or continue playback of a first disparate live media output stream, for example the disparate live media output stream 117a. The first manifest request may comprise one or more parameters. Examples of the one or more parameters may include, but are not limited to, universal resource locators of existing one or more live input streams, identifiers referencing records for existing one or more live input streams or one or more pre-encoded media assets in the CPDS 107, and a plurality of client-specific parameters. Examples of the plurality of client-specific parameters may include, but are not limited to, user preferences and identifiers, client device preferences and identifiers, and one or more rules governed by geolocation data and current position of playback of a first disparate live media output stream, such as the disparate live media output stream 117a, at the first client device, such as the client device 132a.

At 404C, received first manifest request that comprises one or more parameters may be transmitted to the stream selection service 142. In accordance with an embodiment, the PEM 115 of the DACIS 103 may be configured to transmit the received first manifest request that comprises the one or more parameters to the stream selection service 142.

At 454, it may be determined that a set of criteria associated with the first disparate live media output stream is satisfied. In accordance with an embodiment, the stream selection service 142 may be configured to determine if the set of criteria associated with the first disparate live media output stream is satisfied. The set of criteria may include an accessibility of the first disparate live media output stream, update of the first disparate live media output stream and/or compatibility of the first disparate live media output stream having media and/or a manifest with the first manifest request. The stream selection service 142 may be further configured to determine the one or more live input streams and/or one or more pre-encoded media assets based on the one or more parameters in the first manifest request, and additional parameters retrieved from the repository of schedules, rights, and user preferences database 144. The stream selection service 142 may be further configured to determine the one or more live input streams and/or one or more pre-encoded media assets based on rules provided by a stream owner/operator (such as a regional blackout for the first client device leading to an alternative stream to watch) and user preferences (that exclude certain categories) defined in the repository of schedules, rights, and user preferences database 144.

In accordance with an embodiment, when the first disparate live media output stream is not accessible, the first disparate live media output stream is not updated and/or the first disparate live media output stream having media and/or manifest that is not compatible with the first manifest request. Further, in an absence of one or more live input streams, the stream selection service 142 may be configured to select a pre-encoded asset indicated in the first manifest request to continue playback as the first disparate live media output stream. In such embodiment, control passes to operation 456. Otherwise, control passes to operation 406A of the flowchart 400A.

At 456, universal resource locators and/or identifiers that reference records for the selected one or more live input streams or alternate one or more pre-encoded media assets based on the one or more parameters and additional parameters retrieved from the repository of schedules, rights, and user preferences database 144 may be received. In accordance with an embodiment, the PEM 115 of the DACIS 103 may be configured to receive the universal resource locators and/or identifiers that reference records for the selected one or more live input streams or alternate one or more pre-encoded media assets based on the one or more parameters and additional parameters retrieved from the repository of schedules, rights, and user preferences database 144.

At 458, a received first manifest request may be transmitted to the CPDS 107 based on the selected one or more live input streams or alternate one or more pre-encoded media assets. In accordance with an embodiment, the PEM 115 of the DACIS 103 may be configured to transmit the received first manifest request to the CPDS 107 based on the selected one or more live input streams or alternate one or more pre-encoded media assets.

At 460, alternate metadata for alternate additional content may be received from the CPDS 107. In accordance with an embodiment, the PEM 115 of the DACIS 103 may be configured to receive the alternate metadata for the alternate additional content from the CPDS 107. The metadata may include, for example, Ad break locations, overlay markers/triggers, SCTE35 markers/triggers, content duration, and one or more decision points. The alternate metadata may further include a location to transition from the first additional content to the alternate additional content.

At 462, a placement of alternate additional content within the first disparate live media output stream manifest may be determined based on the associated indexed metadata and the alternate metadata. In accordance with an embodiment, the PEM 15 of the DACIS 103 may be configured to determine the placement of the alternate additional content within the first disparate live media output stream manifest based on the associated indexed metadata and the alternate metadata.

At 464, an alternate programming schedule may be generated for the first client device based on the alternate additional content and alternate metadata. In accordance with an embodiment, the PEM 15 of the DACIS 103 may be configured to generate the alternate programming schedule for the first client device, such as the client device 132a, based on the alternate additional content and alternate metadata.

At 466, a final disparate live output stream manifest may be published for the first client device based on the generated alternate programming schedule. In accordance with an embodiment, the PEM 15 of the DACIS 103 may be configured to publish the final disparate live output stream manifest for the first client device, such as the client device 132a, based on the generated alternate programming schedule.

In accordance with an embodiment, the final disparate live output stream manifest for the first client device may be generated based on one of the pre-defined conversion modes. The pre-defined conversion modes may correspond to pre-encoded media assets to live stream mode, pre-encoded media assets to live stream mode with scalable architecture, a live stream to live stream mode, and a mixed mode corresponding to switches between pre-encoded media assets and live streams.

In accordance with an embodiment, during playout, the first additional content may be transitioned to the alternate additional content based on one or more transition parameters. The one or more transition parameters may comprise one or more parameters from the first manifest request, current state of the first disparate live media output stream manifest determined based on accessibility, regular update, and suitable encoding, digital rights management, and compatibility with the first client device, rules provided by a stream owner operator, and user preferences defined in the repository of schedules, rights, and user preferences database 144.

As described above in FIGS. 4A and 4B, the published final disparate live output stream manifest may be transmitted to the media player of the first client device for playback of the final disparate live media output stream. Accordingly, the first client device begins or continues the playback of the final disparate live media output stream.

In an alternate embodiment, at 454, the stream selection service 142 may be configured to select a second disparate live media output stream according to accessibility of the first disparate live media output stream in case the set of criteria associated with the first disparate live media output stream is not satisfied. The stream selection service 142 may be configured to select the second disparate live media output stream according to rules provided by a stream owner/operator and user preferences defined in the repository of schedules, rights, and user preferences database 144. The operations that follow may be performed in a similar manner, as the operations for the first disparate live media output stream are performed.

Figure 5:
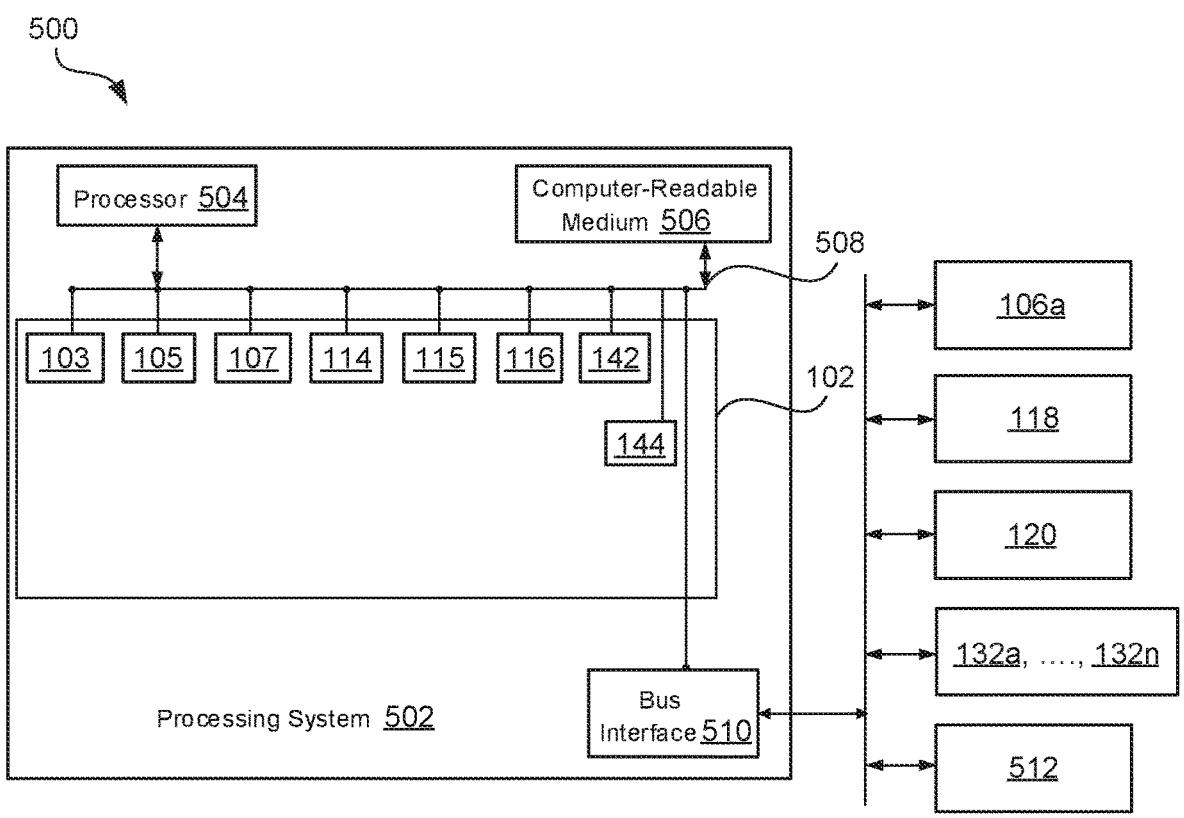
FIG. 5 is a conceptual diagram illustrating an example of a hardware implementation for the DACIS employing a processing system for publishing a disparate per-client live media output stream based on dynamic insertion of targeted non-programming content and customized programming content, and for providing a dynamic playout buffer for a disparate live media output stream, in accordance with exemplary embodiments of the disclosure.

FIG. 5 is a conceptual diagram illustrating an example of a hardware implementation for a media packaging and distribution system 102 employing a processing system for publishing a disparate per-client live media output stream based on dynamic insertion of targeted non-programming content and customized programming content, and for providing a dynamic playout buffer for disparate live media output stream, in accordance with exemplary embodiments of the disclosure. Referring to FIG. 5, the hardware implementation shown by a representation 500 for the media packaging and distribution system 102 employs a processing system 502 for publishing a disparate per-client live media output stream based on dynamic insertion of targeted non-programming content and customized programming content, in accordance with an exemplary embodiment of the disclosure, as described herein.

In some examples, the processing system 502 may comprise one or more hardware processors 504, a non-transitory computer-readable medium 506, a bus 508, a bus interface 510, and a transceiver 512. FIG. 5 further illustrates the DACIS 103, the CDS 105, the CPDS 107, the stream publishing engine 114, PEM 115, indexing and storage system 116, the stream selection service 142, and the repository of schedules, rights, and user preferences database 144, as described in detail in FIGS. 1A and 1B.

The hardware processor 504 may be configured to manage the bus 508 and general processing, including the execution of a set of instructions stored on the non-transitory computer-readable medium 506. The set of instructions, when executed by the processor 504, causes the media packaging and distribution system 102 to execute the various functions described herein for any particular apparatus. The hardware processor 504 may be implemented, based on a number of processor technologies known in the art. Examples of the hardware processor 504 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 506 may be used for storing data that is manipulated by the processor 504 when executing the set of instructions. The data is stored for short periods or in the presence of power. The non-transitory computer-readable medium 506 may also be configured to store data for one or more of the DACIS 103, the CDS 105, the CPDS 107, the stream publishing engine 114, PEM 115, indexing and storage system 116, the stream selection service 142, and the repository of schedules, rights, and user preferences database 144.

The bus 508 is configured to link together various circuits. In this example, the media packaging and distribution system 102 employing the processing system 502 and the non-transitory computer-readable medium 506 may be implemented with bus architecture, represented generally by bus 508. The bus 508 may include any number of interconnecting buses and bridges depending on the specific implementation of the media packaging and distribution system 102 and the overall design constraints. The bus interface 510 may be configured to provide an interface between the bus 508 and other circuits, such as, transceiver 512, and external devices, such as source device 118, external data source 120, and client devices 132a, . . . , 132n.

The transceiver 512 may be configured to provide a communication of the media packaging and distribution system 102 with various other apparatus, such as the Ad decisioning servers 106a, . . . , 106n, the consumer devices 110a, . . . , 110n, such as the client devices 132a, . . . , 132n, the external data source 120, and the source device 118, via the network 108. The transceiver 512 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 5 may include software whose corresponding code may be executed by at least one processor, for across multiple processing environments. For example, the DACIS 103, the CDS 105, the CPDS 107, the stream publishing engine 114, PEM 115, indexing and storage system 116, the stream selection service 142, and the repository of schedules, rights, and user preferences database 144 may include software that may be executed across a single or multiple processing environments.

In an aspect of the disclosure, the processor 504, the non-transitory computer-readable medium 506, or a combination of both may be configured or otherwise specially programmed to execute the operations or functionality of the DACIS 103, the CDS 105, the CPDS 107, the stream publishing engine 114, PEM 115, indexing and storage system 116, the stream selection service 142, and the repository of schedules, rights, and user preferences database 144, or various other components described herein, as described with respect to FIGS. 1A to 4D and FIGS. 6A and 6B.

Figure 6A:
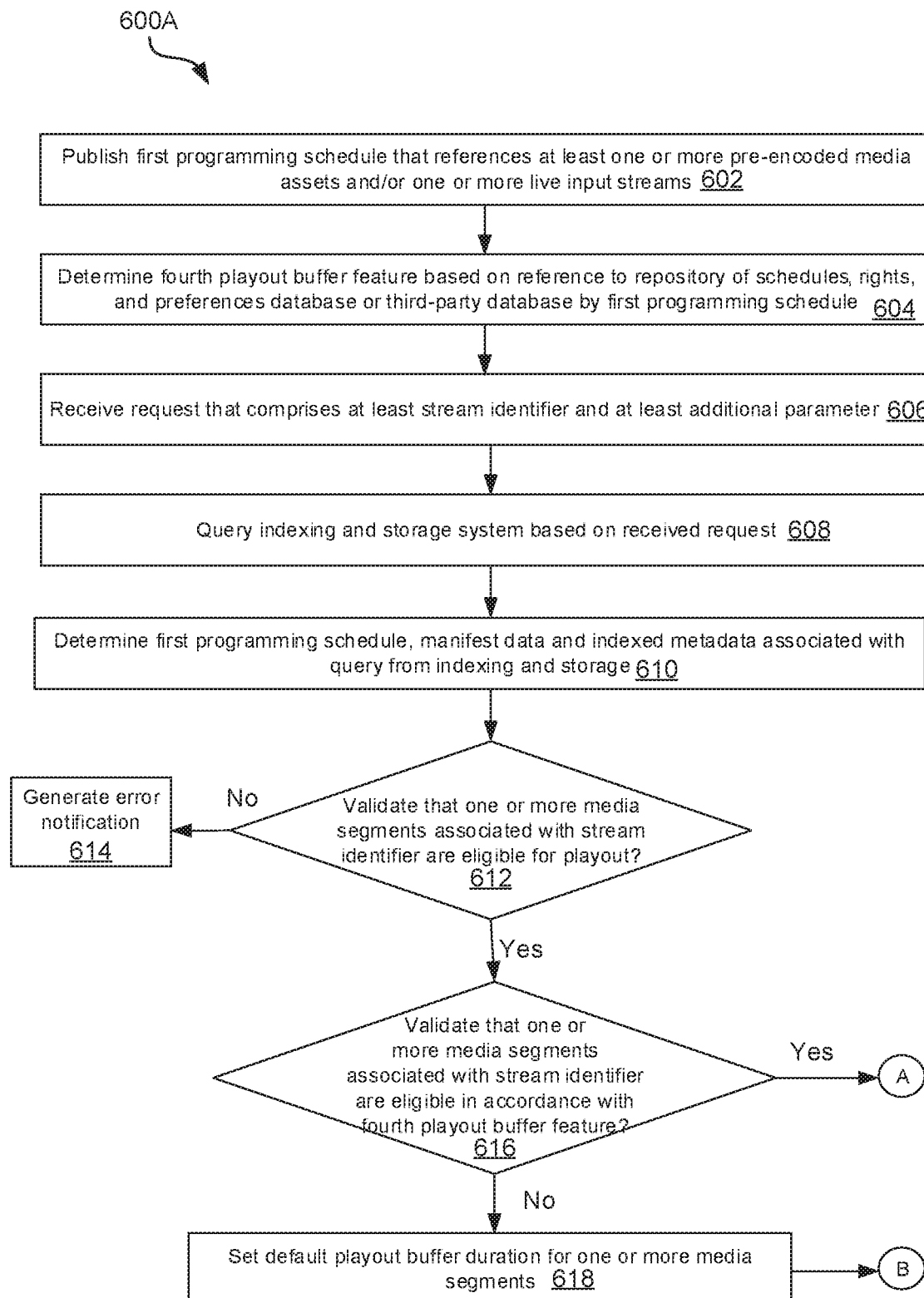
FIGS. 6A and 6B collectively depict a flowchart illustrating exemplary operations for providing a dynamic playout buffer for a disparate live media output stream by the DACIS of FIG. 1B, in accordance with an exemplary embodiment of the disclosure.
Figure 6B:
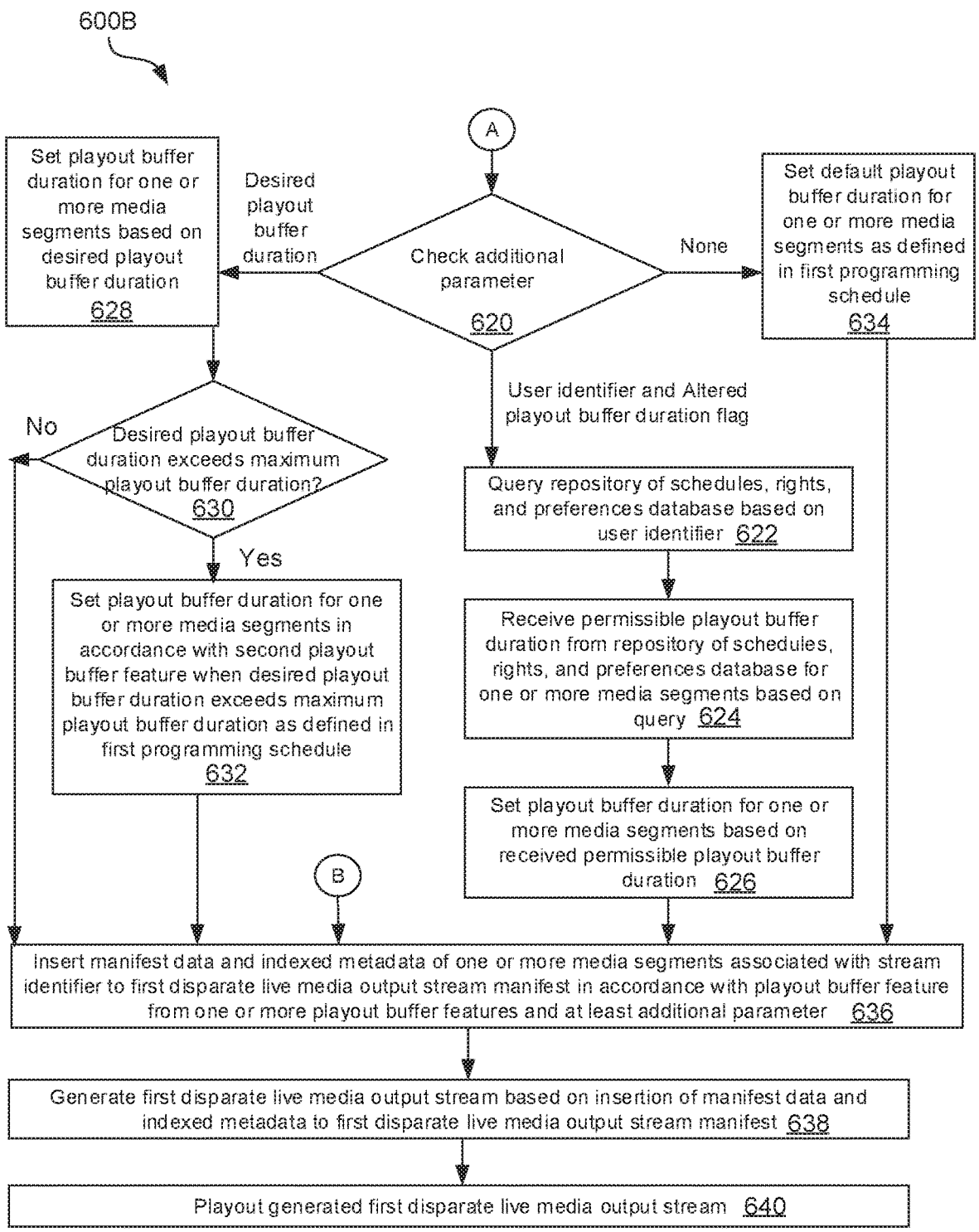

FIGS. 6A and 6B collectively depict a flowchart illustrating exemplary operations for providing a dynamic playout buffer for a disparate live media output stream by the DACIS 103 of FIG. 1B, in accordance with an exemplary embodiment of the disclosure.

At 602, a first programming schedule, such as the first programming schedule 111, may be published that references at least one or more pre-encoded media assets and/or one or more live input streams. In accordance with an embodiment, the PEM 115 of the DACIS 103 may be configured to publish the first programming schedule 111 that references at least one or more pre-encoded media assets and/or one or more live input streams. Thus, the PEM 115 of the DACIS 103 may publish the first programming schedule 111 referencing at least one live input stream or a pre-encoded asset as a source to be used in at least a first disparate live media output stream. In accordance with an embodiment, the one or more live input streams may comprise pre-encoded media assets. In accordance with another embodiment, the one or more live input streams may comprise singularly encoded live input streams. Various media container formats of the live input streams and/or pre-encoded media assets may include, but are not limited to, transport stream (TS), fragmented MP4 (fMP4), Common Media Application Format (CMAF) and the like.

In accordance with an embodiment, the published first programming schedule 111 may comprise one or more playout buffer features enabled via one or more constraints and rights. Each playout buffer feature of the one or more playout buffer features may be associated with a corresponding number of media segments that represents the one or more pre-encoded media assets and/or the one or more live input streams. A playout buffer may correspond to a specific number of media segments referenced in the first disparate live media output stream manifest. The playout buffer may represent a maximum duration of time based on a target duration per media segment.

In accordance with various embodiments, a first playout buffer feature of the one or more playout buffer features may correspond to a minimum playout buffer size. The minimum playout buffer size may indicate a minimum number of media segments that represents the one or more pre-encoded media assets and/or the one or more live input streams, as defined in the first programming schedule 111. A second playout buffer feature of the one or more playout buffer features may correspond to a maximum playout buffer size. The maximum playout buffer size may indicate a maximum number of media segments that represents the one or more pre-encoded media assets and/or the one or more live input streams, as defined in the first programming schedule 111. A third playout buffer feature of the one or more playout buffer features may correspond to a default playout buffer size. The default playout buffer size may indicate a pre-specified number of media segments that represents the one or more pre-encoded media assets and/or the one or more live input streams, as defined in the first programming schedule 111.

At 604, a fourth playout buffer feature may be determined based on a reference to the repository of schedules, rights, and preferences database 144 or a third-party database by the first programming schedule 111. In accordance with an embodiment, the PEM 115 of the DACIS 103 may be configured to determine the fourth playout buffer feature based on a reference to the repository of schedules, rights, and preferences database 144 or a third-party database by the first programming schedule 111.

In accordance with an embodiment, the fourth playout buffer feature of the one or more playout buffer features may correspond to an altered playout buffer size. The altered playout buffer size may indicate an altered number of media segments that represents the one or more pre-encoded media assets and/or the one or more live input streams, as defined in the first programming schedule 111.

At 606, a request may be received that comprises at least a stream identifier and at least an additional parameter. In accordance with an embodiment, the stream publishing engine 114 in the DACIS 103 may be configured to receive the request that comprises at least a stream identifier and at least an additional parameter. In accordance with an embodiment, the request may be generated by a client device, for example the first client device, such as client device 132a, for the generation or retrieval of the first disparate media output stream. In accordance with another embodiment, the request may be generated by an automated service for the generation or retrieval of the first disparate media output stream. In accordance with another embodiment, the request may be generated by the client device and the automated service for the generation or retrieval of the first disparate media output stream.

In accordance with an embodiment, the additional parameter may include a user identifier and an altered live window duration flag. The user identifier may correspond to a user associated with a corresponding client device, such as the client device 132a, at which the request is generated. The user identifier parameter may enable the stream publishing engine 114 to publish unique-to-client first disparate media output stream manifest leveraging the different indexes created by the indexing and storage system 116 from programming content (such as, live input streams and pre-encoded media assets), and non-programming content (such as advertisements) based on a defined per-client schedule, such as the first programming schedule 111. The altered live window duration flag may correspond to a marker that may indicate that a permissible playout buffer duration may be retrieved from the repository of schedules, rights, and preferences database 144 for the one or more media segments.

In accordance with another embodiment, the additional parameter may include a desired live window duration. The desired live window duration may correspond to a playout buffer duration that may be specified by the user provided that the desired live window duration does not exceed the maximum playout buffer duration. In case the desired live window duration exceeds the maximum playout buffer duration, the stream publishing engine 114 may set the playout buffer duration to the maximum playout buffer duration, as defined in the first programming schedule 111.

At 608, the indexing and storage system 116 may be queried based on the received request. In accordance with an embodiment, the stream publishing engine 114 in the DACIS 103 may be configured to query the indexing and storage system 116 based on the received request. The query may comprise the stream identifier of the first disparate media output stream.

At 610, the first programming schedule 111, the manifest data and the indexed metadata associated with the query may be determined. In accordance with an embodiment, the stream publishing engine 114 in the DACIS 103 may be configured to determine the first programming schedule 111, the manifest data and the indexed metadata associated with the query from the indexing and storage system 116. The indexing and storage system 116 may be configured to retrieve the first programming schedule 111, the manifest data and the indexed metadata associated with the query and respond back to the stream publishing engine 114 in the DACIS 103.

In accordance with an embodiment, the manifest data and the indexed metadata may correspond to the one or more media segments associated with the stream identifier to be inserted to the first disparate live media output stream manifest in accordance with the first programming schedule 111, the playout buffer feature from the one or more playout buffer features, and at least the additional parameter.

In accordance with an embodiment, the indexing and storage system 116 of the DACIS 103 may be configured to record content of manifest data that may correspond to the one or more media segments associated with the stream identifier. The one or more media segments may further correspond to one or both of the one or more pre-encoded media assets and/or the one or more live input streams, including any variants defined in a master manifest. The manifest data may correspond to one or both of an encoded live input stream and a pre-encoded media asset associated with the stream identifier. The manifest data may define at least an associated media content, one or more programming indicators (such as SCTE messages), timing metadata, one or more media content identifiers, and one or more contextual event identifiers. The timing metadata may correspond to the playback position in the published first programming schedule 111.

In accordance with an embodiment, the indexing and storage system 116 of the DACIS 103 may be further configured to process the manifest data to create the indexed metadata. The indexed metadata may define one or more program indicators (such as program start/end) and calculated durations, a program identification (that correspond to a programming content that is currently playing), non-programming content indicators (such as Ad break start/end) and calculated durations, a non-programming content identification (that correspond to Ads that are currently playing), and one or more event markers (such as blackout notifications).

In accordance with an embodiment, the indexing and storage system 116 of the DACIS 103 may be further configured to maintain the manifest data and the indexed metadata to encompass a time-range specified in the published first programming schedule 111. For example, the indexing and storage system 116 may keep 24 hours of indexed metadata despite the live input stream being published in 5 minute increments.

At 612, it may be validated that the one or more media segments associated with the stream identifier are eligible for a playout. In accordance with an embodiment, the stream publishing engine 114 in the DACIS 103 may be configured to validate that the one or more media segments associated with the stream identifier are eligible for the playout. In an embodiment, the stream publishing engine 114 fails to validate that the one or more media segments associated with the stream identifier are eligible for the playout and the control passes to 614. In another embodiment, the stream publishing engine 114 validates that the one or more media segments associated with the stream identifier are eligible for the playout and the control passes to 616.

At 614, an error notification may be generated when the one or more media segments associated with the stream identifier are ineligible for the playout. In accordance with an embodiment, the stream publishing engine 114 in the DACIS 103 may be configured to generate the error notification when the one or more media segments associated with the stream identifier are ineligible for the playout. For example, if the one or more media segments are not eligible, the stream publishing engine 114 may return an unauthorized error to the first client device, such as client device 132*a*.

At 616, it may be validated that the one or more media segments associated with the stream identifier are eligible in accordance with the fourth playout buffer feature enabled via the one or more constraints and rights. In accordance with an embodiment, the stream publishing engine 114 in the DACIS 103 may be configured to validate that the one or more media segments associated with the stream identifier are eligible in accordance with the fourth playout buffer feature enabled via the one or more constraints and rights. In an embodiment, the stream publishing engine 114 in the DACIS 103 may fail to validate that the one or more media segments associated with the stream identifier are eligible in accordance with the fourth playout buffer feature enabled via the one or more constraints and rights, and the control passes to step 618. In another embodiment, the stream publishing engine 114 in the DACIS 103 may validate that the one or more media segments associated with the stream identifier are eligible in accordance with the fourth playout buffer feature enabled via the one or more constraints and rights and the control passes to step 620.

At 618, a default playout buffer duration for the one or more media segments may be set when the one or more media segments associated with the stream identifier are ineligible in accordance with the fourth playout buffer feature. In accordance with an embodiment, the stream publishing engine 114 in the DACIS 103 may be configured to set the default playout buffer duration for the one or more media segments when the one or more media segments associated with the stream identifier are ineligible in accordance with the fourth playout buffer feature. In such an embodiment, the default playout buffer duration is defined in the first programming schedule 111. Once the default playout buffer duration is set, control passes to 636 for insertion of the manifest data and indexed metadata of one or more media segments associated with the stream identifier to the first disparate live media output stream manifest in accordance with the default playout buffer duration.

At 620, the additional parameter may be checked. In accordance with an embodiment, the stream publishing engine 114 in the DACIS 103 may be configured to check for the additional parameter. In an embodiment, when the additional parameter comprises both of the user identifier and the altered playout buffer duration flag, control passes to 622. In another embodiment, when the additional parameter comprises desired playout buffer duration, control passes to 628. In another embodiment, when the additional parameter comprises none of the desired playout buffer duration, and the user identifier and an altered playout buffer duration flag as well, control passes to 634.

At 622, the repository of schedules, rights, and preferences database 144 may be queried based on the user identifier when the one or more media segments associated with the stream identifier are eligible in accordance with the fourth playout buffer feature and at least the additional parameter comprises both of the user identifier and the altered playout buffer duration flag. In accordance with an embodiment, based the stream publishing engine 114 in the DACIS 103 may be configured to query the repository of schedules, rights, and preferences database 144 based on the user identifier when the one or more media segments associated with the stream identifier are eligible in accordance with the fourth playout buffer feature and at least the additional parameter comprises both of the user identifier and the altered playout buffer duration flag. The repository of schedules, rights, and preferences database 144 may be configured to determine a permissible playout buffer duration associated with the user identifier and return the permissible playout buffer duration to the stream publishing engine 114.

At 624, the permissible playout buffer duration for the one or more media segments may be received based on the query. In accordance with an embodiment, the stream publishing engine 114 in the DACIS 103 may be configured to receive the permissible playout buffer duration from the repository of schedules, rights, and preferences database 144 for the one or more media segments based on the query.

At 626, the playout buffer duration for the one or more media segments based on the received permissible playout buffer duration may be set. In accordance with an embodiment, the stream publishing engine 114 in the DACIS 103 may be configured to set the playout buffer duration for the one or more media segments based on the received permissible playout buffer duration. In other words, if eligible for the playout and the request includes both of the user identifier and the altered playout buffer duration flag, the stream publishing engine 114 may set the playout buffer duration according to the received permissible playout buffer duration. Control passes to 636 for insertion of the manifest data and indexed metadata of one or more media segments associated with the stream identifier to the first disparate live media output stream manifest in accordance with the playout buffer duration according to the received permissible playout buffer duration.

At 628, the playout buffer duration for the one or more media segments may be set based on the desired playout buffer duration when the one or more media segments associated with the stream identifier are eligible in accordance with the fourth playout buffer feature and at least the additional parameter comprises a desired playout buffer duration for the one or more media segments associated with the stream identifier. In accordance with an embodiment, the stream publishing engine 114 in the DACIS 103 may be configured to set the playout buffer duration for the one or more media segments based on the desired playout buffer duration when the one or more media segments associated with the stream identifier are eligible in accordance with the fourth playout buffer feature and at least the additional parameter comprises a desired playout buffer duration for the one or more media segments associated with the stream identifier. In other words, if eligible and request includes the desired live window duration, the stream publishing engine 114 may set the playout buffer duration according to value dictated by desired live window duration.

At 630, it may be checked if the desired playout buffer duration exceeds the maximum playout buffer duration as defined in the first programming schedule 111. In accordance with an embodiment, the stream publishing engine 114 in the DACIS 103 may be configured to check if the desired playout buffer duration exceeds the maximum playout buffer duration as defined in the first programming schedule 111. In an embodiment, when the desired playout buffer duration exceeds the maximum playout buffer duration as defined in the first programming schedule 111, control passes to 632. In another embodiment, when the desired playout buffer duration does not exceed the maximum playout buffer duration as defined in the first programming schedule 111, control passes to 636 for insertion of manifest data and indexed metadata of one or more media segments associated with the stream identifier to the first disparate live media output stream manifest in accordance with the playout buffer duration based on the desired playout buffer duration.

At 632, playout buffer duration for the one or more media segments may be set in accordance with the second playout buffer feature when the desired playout buffer duration exceeds the maximum playout buffer duration as defined in the first programming schedule 111. In accordance with an embodiment, the stream publishing engine 114 in the DACIS 103 may be configured to set the playout buffer duration for the one or more media segments in accordance with the second playout buffer feature when the desired playout buffer duration exceeds the maximum playout buffer duration as defined in the first programming schedule 111. Control passes to 636 for insertion of manifest data and indexed metadata of one or more media segments associated with the stream identifier to the first disparate live media output stream manifest in accordance with the second playout buffer feature.

At 634, the default playout buffer duration may be set for the one or more media segments as defined in the first programming schedule 111 when the one or more media segments associated with the stream identifier are eligible for the playout and the at least the additional parameter does not comprise the altered playout buffer duration flag or the desired playout buffer duration. In accordance with an embodiment, the stream publishing engine 114 in the DACIS 103 may be configured to set the default playout buffer duration for the one or more media segments as defined in the first programming schedule 111 when the one or more media segments associated with the stream identifier are eligible for the playout and the at least the additional parameter does not comprise the altered playout buffer duration flag or the desired playout buffer duration. In other words, if eligible and request does not include the altered live window duration flag or the desired live window duration, the stream publishing engine 114 may use default live window duration defined in the first programming schedule 111. Control passes to 636 for insertion of manifest data and indexed metadata of one or more media segments associated with the stream identifier to the first disparate live media output stream manifest in accordance with the default live window duration.

At 636, manifest data and indexed metadata of one or more media segments associated with the stream identifier may be inserted to the first disparate live media output stream manifest in accordance with the playout buffer feature from the one or more playout buffer features and at least the additional parameter. In accordance with an embodiment, the stream publishing engine 114 in the DACIS 103 may be configured to insert the manifest data and indexed metadata of one or more media segments associated with the stream identifier to the first disparate live media output stream manifest in accordance with the playout buffer feature from the one or more playout buffer features and at least the additional parameter. As received from steps 618, 626, 630, 632, and 634, the playout buffer feature and the additional parameter may correspond to different embodiments in accordance with which the playout buffer duration is set.

In accordance with one embodiment, the manifest data and indexed metadata of one or more media segments associated with the stream identifier that may be inserted to the first disparate live media output stream manifest in accordance with the default playout buffer duration for the one or more media segments, as set in step 618.

In accordance with another embodiment, the manifest data and indexed metadata of one or more media segments associated with the stream identifier that may be inserted to the first disparate live media output stream manifest in accordance with the playout buffer duration for one or more media segments based on received permissible playout buffer duration, as set in step 626.

In accordance with another embodiment, the manifest data and indexed metadata of one or more media segments associated with the stream identifier that may be inserted to the first disparate live media output stream manifest in accordance with the playout buffer duration for one or more media segments based on desired playout buffer duration, as set in step 630.

In accordance with another embodiment, the manifest data and indexed metadata of one or more media segments associated with the stream identifier that may be inserted to the first disparate live media output stream manifest in accordance with the playout buffer duration for one or more media segments in accordance with second playout buffer feature, as set in step 632.

In accordance with another embodiment, the manifest data and indexed metadata of one or more media segments associated with the stream identifier that may be inserted to the first disparate live media output stream manifest in accordance with the default playout buffer duration for one or more media segments as defined in first programming schedule 111, as set in step 634.

At 636, a first disparate live media output stream may be generated based on the insertion of the manifest data and indexed metadata to the first disparate live media output stream manifest. In accordance with an embodiment, the stream publishing engine 114 in the DACIS 103 may be configured to generate the first disparate live media output stream based on the insertion of the manifest data and indexed metadata to the first disparate live media output stream manifest.

The stream publishing engine 114 may generate the first disparate live media output stream manifest based on one of a pre-defined conversion modes. The pre-defined conversion modes may correspond to pre-encoded media assets to live stream mode, pre-encoded media assets to live stream mode with scalable architecture, a live stream to live stream mode, and a mixed mode corresponding to switching between pre-encoded media assets and live streams.

At 638, the generated first disparate live media output stream may be played out. In accordance with an embodiment, the stream publishing engine 114 in the DACIS 103 may be configured to playout the generated first disparate live media output stream. In an embodiment, the first disparate live media output stream manifest continues the insertion of the manifest data and indexed metadata of the one or more media segments until a total number of the one or more media segments reaches the desired playout buffer duration. In another embodiment, the first disparate live media output stream manifest maintains the playout buffer duration based on removal of the manifest data and indexed metadata of an oldest media segment for each insertion of the manifest data and indexed metadata of a new media segment when the desired playout buffer duration is reached.

Various embodiments of the disclosure comprise the media packaging and distribution system 102 that may be configured to publish disparate live media output streams to be viewed on a plurality of consumer devices (such as the consumer devices 110a, . . . , 110n) based on user selection.

The media packaging and distribution system 102 may comprise, for example, the DACIS 103, the CDS 105, the CPDS 107, the stream publishing engine 114, PEM 115, indexing and storage system 116, the stream selection service 142, and the repository of schedules, rights, and user preferences database 144. In accordance with an embodiment, one or more processors in the DACIS 103 may be configured to receive a first manifest request, comprising one or more parameters, from a first client device, such as client device 132*a*. The one or more processors in the DACIS 103 may be further configured to determine a first additional content comprising a customized first programming content and a targeted first non-programming content for the first client device based on the one or more parameters and associated indexed metadata retrieved based on the one or more parameters. The one or more processors in the DACIS 103 may be further configured to generate the first programming schedule 111, for the first client device based on selected one or more live input stream and/or the one or more pre-encoded media assets, the associated indexed metadata, and the determined first additional content. The one or more processors in the DACIS 103 may be further configured to select one or more live input stream manifests and/or one or more pre-encoded media asset manifests published in the content delivery system 130 and associated indexed metadata based on the one or more parameters. The one or more processors in the DACIS 103 may be further configured to publish a first disparate live media output stream manifest for the first client device based on insertion of the selected one or more live input stream manifests and/or the one or more pre-encoded media asset manifests, the associated indexed metadata, and the determined first additional content in accordance with the first programming schedule 111, generated for the first client device.

In accordance with an embodiment, the one or more processors in the DACIS 103 may be further configured to index a plurality of media segments indicated by the one or more pre-encoded media asset manifests and the one or more live input stream manifests, the associated indexed metadata, the targeted first non-programming content, and the customized first programming content based on the first programming schedule 111 generated for the first client. In accordance with an embodiment, the one or more processors in the DACIS 103 may be further configured to insert the first additional content at one or more content placement opportunities indicated in the first disparate live media output stream manifest based on the first programming schedule 111 generated for the first client device. The one or more content placement opportunities may be defined by the metadata associated with the one or more live input streams corresponding to the one or more live input stream manifests and/or one or more pre-encoded media assets corresponding to the one or more pre-encoded media asset manifests. The insertion of the targeted first non-programming content and the customized first programming content in real time, the associated indexed metadata and/or the one or more content placement opportunities may include programming content indicators, non-programming content indicators, graphical treatment indicators, and interactive content indicators.

In accordance with an embodiment, the insertion of the customized first programming content, in an instance in which the generated first disparate live media output stream manifest corresponds to a disparate live media output stream, a first set of processors in the DACIS 103 may be further configured to receive universal resource locators and/or identifiers referencing records for the selected one or more live input streams and/or the one or more pre-encoded media assets from the CPDS 107. The associated indexed metadata and/or one or more content placement opportunities may include programming content indicators, non-programming content indicators, graphical treatment indicators, and interactive content indicators. The programming content indicators may comprise a plurality of categories for the customized first programming content.

In accordance with an embodiment, the first set of processors in the DACIS 103 may be further configured to transmit a request to the CDS 105 for determining the customized first programming content from a content package and distribution system for matching one or more personalization parameters. The one or more personalization parameters may include user preferences and identifiers from the first manifest request or retrieved from the repository of schedules, rights, and user preferences database 144, and time constraints. The time constraints may be determined based on user preferences retrieved from the repository of schedules, rights, and user preferences database 144, a range defined in the first manifest request, and schedule tolerances defined in the repository of schedules, rights, and user preferences database 144, client device preferences or identifiers from the first manifest request or retrieved from the repository of schedules, rights, and user preferences database 144, geolocation information from the first manifest request or retrieved from the repository of schedules, rights, and user preferences database 144, and/or a content recommendation engine.

In accordance with an embodiment, the one or more parameters may comprise universal resource locators and/or identifiers referencing records for one or more live input streams or one or more pre-encoded media assets in the CPDS 107, a plurality of client-specific parameters, and a plurality of client-specified attributes derived from a user interaction with the first client device. The plurality of client-specific parameters may comprise user preferences and identifiers, client device preferences and identifiers, and one or more rules governed by geolocation data and current position of playback of a first disparate live media output stream at the first client device. In accordance with an embodiment, for the insertion of the targeted first non-programming content, the plurality of client-specified attributes may comprise the user interaction with interactive content in the customized first programming content and the targeted first non-programming content, and a preference for a type and/or category of the targeted first non-programming content and/or the customized first programming content. The user interaction with the interactive content comprises a selection to exclude the targeted first non-programming content and/or the customized first programming content, a selection to include a subset of the targeted first non-programming content and/or the customized first programming content, and a selection to include all of the targeted first non-programming content and/or the customized first programming content within one or more specified non-programming content locations. The targeted first non-programming content may comprise personalized advertisements including video advertisements, graphical treatment, cue points, and the interactive content comprising a set of interactive elements for the targeted first non-programming content. The customized first programming content may comprise personalized non-advertising content including promotional content, a short-form content, and an alternate additional content for replacement of at least a portion of a first disparate live media output stream generated for the first client.

In accordance with an embodiment, the one or more processors in the DACIS 103 may be further configured to transmit the published first disparate live media output stream manifest to a media player of the first client device for a playback of a first disparate live media output stream. The media player, during playback of the first disparate live media output stream at the first client device, may present one or more decision points defined by the interactive content to initiate a user interaction at the first client device. At the one or more decision points, the user interaction may correspond to one of a desired selection corresponding to the user interaction with one or more interactive elements, or a default selection corresponding to non-interaction of a user with the customized first programming content and/or the targeted first non-programming content in the first disparate live media output stream played back by the media player. The desired selection or the default selection may be transmitted to an external storage system that is the repository of schedules, rights, and user preferences database 144. At the one or more decision points, the one or more interactive elements may be configured to exclude the targeted first non-programming content or the customized first programming content and be replaced by default content, select alternate customized first programming content, select a subsequent second programming content, approve or disapprove selected customized first programming content, exclude subsequent second non-programming content for a remaining portion of the first disparate live media output stream played back by the media player, select one or more targeted first non-programming content of a specific category, or view some or all of the targeted first non-programming content immediately to avoid some or all of the targeted first non-programming content for the remaining portion of the first disparate live media output stream played back by the media player.

In accordance with an embodiment, the one or more processors in the DACIS 103 may be further configured to modify a remaining portion of the first programming schedule 111 that generates first disparate live media output stream corresponding to the first manifest request generated by the first client device based on the user interaction with the interactive content. A first set of processors in the DACIS 103 may be configured to receive the first manifest request from a second set of processors in the DACIS 103, select, based on the received first manifest request, one or more live input streams and/or one or more pre-encoded media assets based on the one or more parameters and additional parameters retrieved from the repository of schedules, rights, and user preferences database 144, and transmit universal resource locators and/or identifiers referencing records for the selected one or more live input streams and/or the one or more pre-encoded media assets to the second set of processors in the DACIS 103.

In accordance with an embodiment, the second set of processors in the DACIS 103 may be further configured to retrieve the indexed metadata associated with the selected one or more live input streams and/or the one or more pre-encoded media assets from the CPDS 107. The associated indexed metadata may define one or more content placement opportunities within the selected one or more live input streams and/or the one or more pre-encoded media assets. The customized first programming content and the targeted first non-programming content may be identified as the first additional content to be scheduled at the one or more content placement opportunities based on the one or more parameters in the received first manifest request and the associated indexed metadata, wherein the generated first programming schedule 111 excludes the first additional content or includes the first additional content completely or partially.

In accordance with an embodiment, a third set of processors in the DACIS 103 may be further configured to insert, based on the generated first programming schedule 111, the identified customized first programming content and the targeted first non-programming content into the first disparate live media output stream manifest in accordance with the one or more content placement opportunities defined in the associated indexed metadata and one or more rules and conditions defined in the repository of schedules, rights, and user preferences database 144. The identification of the targeted first non-programming content may be based on execution of a non-programming content service based on rules and conditions defined in additional parameters of the repository of schedules, rights, and user preferences database 144, and the one or more parameters defined in the first manifest request. The identification of the customized first programming content may be based on execution of the CDS 105 based on the rules and conditions defined in the additional parameters of the repository of schedules, rights, and user preferences database 144. In accordance with an embodiment, the first programming schedule 111 may define locations and types of one or more decision points defined by one or more content placement opportunities in the indexed metadata. In an instance when one or more pre-encoded media assets are being scheduled and the one or more decision points defined by the one or more content placement opportunities are to be inserted in the first programming schedule 111, the first programming schedule 111 may be configured to control the one or more pre-encoded media asset manifests to be published as the first disparate live media output stream manifest.

In accordance with an embodiment, a conversion of one or more pre-encoded media assets into a first disparate live media output stream facilitates one or more subsequent modifications on the first disparate live media output stream. The one or more subsequent modifications may correspond to a user selection, a user preference, a change in the first programming schedule 111, or a time or geolocation-based rule.

In accordance with an embodiment, the first set of processors in the DACIS 103 may be further configured to transmit universal resource locators and/or identifiers referencing records for the selected one or more live input streams and/or the one or more pre-encoded media assets to the second set of processors. In an absence of one or more live input streams, the first set of processors may be configured to select a pre-encoded asset indicated in the first manifest request to continue playback as the first disparate live media output stream. The second set of processors may be configured to select a second disparate live media output stream according to accessibility of the first disparate live media output stream. The first disparate live media output stream is not updated and/or the first disparate live media output stream has media and/or a manifest that is incompatible with a client request. The second set of processors may be further configured to select the second disparate live media output stream according to rules provided by a stream owner/operator and user preferences defined in the repository of schedules, rights, and user preferences database 144.

In accordance with an embodiment, the one or more processors in the DACIS 103 may be further configured to transition from the first additional content to an alternate additional content based on one or more transition parameters. The one or more transition parameters may comprise one or more parameters from the first manifest request, current state of the first disparate live media output stream manifest determined based on accessibility, regular update, and suitable encoding, digital rights management, and compatibility with the first client device, rules provided by a stream owner operator, and user preferences defined in the repository of schedules, rights, and user preferences database 144.

In accordance with an embodiment, the one or more processors in the DACIS 103 may be further configured to retrieve alternate metadata for the alternate additional content from the CPDS 107. The alternate metadata may indicate a location to transition from the first additional content to the alternate additional content. The one or more processors may be further configured to determine placement of the alternate additional content within the first disparate live media output stream manifest based on the associated indexed metadata and the alternate metadata. The one or more processors may be further configured to generate the alternate programming schedule 113, for the first client device based on the alternate additional content and the alternate metadata, and transmit the generated alternate programming schedule to the first set of processors. The first set of processors may be configured to generate a final disparate live output stream manifest for the first client device. In accordance with an embodiment, another conversion of the first disparate live media output stream into the one or more pre-encoded media assets facilitates download of the one or more pre-encoded media assets at the first client device and mitigates dependency on the system for playback of remaining portion. In accordance with an embodiment, the one or more processors in the DACIS 103 may be further configured to receive a request from the first client device, wherein the request comprises the one or more parameters. The one or more processors in the DACIS 103 may be further configured to determine alternate additional content for inclusion in the first disparate live media output stream manifest or replacement of the first additional content in the first disparate live media output stream manifest based on the one or more parameters. The one or more processors in the DACIS 103 may be further configured to modify the first programming schedule 111 to generate an alternate programming schedule for the first client device based on the alternate additional content and associated metadata. The one or more processors in the DACIS 103 may be further configured to transmit the generated alternate programming schedule to a second set of processors, wherein the second set of processors is configured to generate a final disparate live output stream manifest for the first client device.

In accordance with an embodiment, the one or more processors in the DACIS 103 may be further configured to revoke the first disparate live media output stream manifest published for the first client device based on an identifier primitive associated with the first disparate live media output stream of the first client device in an instance in which a media player of the first client device is determined to be a plagiarized media player. The first disparate live media output stream may include at least one unique identifier inserted by the one or more processors in the DACIS 103.

In accordance with various embodiments, the first disparate live media output stream manifest for the first client device may be generated based on one of a pre-defined conversion modes. The pre-defined conversion modes may correspond to pre-encoded media assets to live stream mode, pre-encoded media assets to live stream mode with scalable architecture, a live stream to live stream mode, and a mixed mode corresponding to switching between pre-encoded media assets and live streams.

In accordance with an embodiment, one or more processors in the PEM 115 may be configured to receive a first manifest request, comprising one or more parameters, from the first client device. Further, the received first manifest request may be transmitted to a first set of processors in the stream selection service 142. The first set of processors may be configured to select, based on the received first manifest request, one or more live input streams and/or one or more pre-encoded media assets based on the one or more parameters and additional parameters retrieved from the repository of schedules, rights, and user preferences database 144. The one or more processors in the PEM 115 may be configured to receive universal resource locators and/or identifiers referencing records for the selected one or more live input streams and/or the one or more pre-encoded media assets from the first set of processors. The one or more processors in the PEM 115 may be configured to retrieve indexed metadata associated with the selected one or more live input streams and/or the one or more pre-encoded media assets from a content packaging and distribution system, wherein the indexed metadata defines one or more content placement opportunities within the selected one or more live input streams and/or the one or more pre-encoded media assets. The one or more processors in the PEM 115 may be further configured to identify a customized first programming content and a targeted first non-programming content as a first additional content to be scheduled in the one or more content placement opportunities based on the one or more parameters in the received first manifest and the associated indexed metadata. The one or more processors in the PEM 115 may be further configured to generate the first programming schedule 111 for the first client device based on the associated indexed metadata, the first additional content and the one or more live input streams and/or one or more pre-encoded media assets.

Various embodiments of the disclosure comprise one or more processors in the media packaging and distribution system 102 that may be configured to provide a dynamic playout buffer for disparate live media output stream to be viewed on a plurality of consumer devices (such as the consumer devices 110*a*, . . . , 110*n*). The media packaging and distribution system 102 may comprise, for example, the DACIS 103, the stream publishing engine 114, the PEM 115, the indexing and storage system 116, and the repository of schedules, rights, and user preferences database 144. The one or more processors in the DACIS 103 may be configured to publish the first programming schedule 111 that may reference at least one or more pre-encoded media assets and/or one or more live input streams. The published first programming schedule 111 may comprise one or more playout buffer features enabled via one or more constraints and rights. Each playout buffer feature of the one or more playout buffer features may be associated with a corresponding number of media segments that represents the one or more pre-encoded media assets and/or the one or more live input streams. The one or more processors in the DACIS 103 may be further configured to receive a request that comprises at least a stream identifier and at least an additional parameter. The one or more processors in the DACIS 103 may be further configured to insert manifest data and indexed metadata of one or more media segments associated with the stream identifier to a first disparate live media output stream manifest in accordance with a playout buffer feature from the one or more playout buffer features and at least the additional parameter. The one or more processors in the DACIS 103 may be further configured to generate a first disparate live media output stream based on the insertion of the manifest data and indexed metadata to the first disparate live media output stream manifest.

In accordance with various embodiments, a first playout buffer feature of the one or more playout buffer features may correspond to a minimum playout buffer size. The minimum playout buffer size may indicate a minimum number of media segments that represents the one or more pre-encoded media assets and/or the one or more live input streams, as defined in the first programming schedule 111. A second playout buffer feature of the one or more playout buffer features may correspond to a maximum playout buffer size. The maximum playout buffer size may indicate a maximum number of media segments that represents the one or more pre-encoded media assets and/or the one or more live input streams, as defined in the first programming schedule 111. A third playout buffer feature of the one or more playout buffer features may correspond to a default playout buffer size. The default playout buffer size may indicate a pre-specified number of media segments that represents the one or more pre-encoded media assets and/or the one or more live input streams, as defined in the first programming schedule 111. A fourth playout buffer feature of the one or more playout buffer features may correspond to an altered playout buffer size. The altered playout buffer size may indicate an altered number of media segments that represents the one or more pre-encoded media assets and/or the one or more live input streams, as defined in the first programming schedule 111. In accordance with an embodiment, the one or more processors in the DACIS 103 may be configured to determine the fourth playout buffer feature based on a reference to a repository of schedules, rights, and preferences database 144 or a third-party database by the first programming schedule 111. The request may be generated by at least one of a client device or an automated service for the generation of the first disparate media output stream.

In accordance with an embodiment, the one or more processors in the DACIS 103 may be further configured to query the indexing and storage system 116 based on the received request. The query may comprise the stream identifier. In accordance with an embodiment, the one or more processors in the DACIS 103 may be further configured to determine the first programming schedule 111, the manifest data and the indexed metadata associated with the query. The manifest data and the indexed metadata may correspond to the one or more media segments associated with the stream identifier to be inserted to the first disparate live media output stream manifest in accordance with the first programming schedule 111, the playout buffer feature from the one or more playout buffer features, and at least the additional parameter.

In accordance with an embodiment, the one or more processors in the DACIS 103 may be further configured to validate that the one or more media segments associated with the stream identifier are eligible for a playout. Accordingly, the one or more processors in the DACIS 103 may be further configured to generate an error notification when the one or more media segments associated with the stream identifier are ineligible for the playout.

In accordance with an embodiment, the one or more processors in the DACIS 103 may be further configured to validate that the one or more media segments associated with the stream identifier are eligible in accordance with the fourth playout buffer feature enabled via the one or more constraints and rights. In accordance with an embodiment, the one or more processors in the DACIS 103 may be further configured to set a default playout buffer duration for the one or more media segments when the one or more media segments associated with the stream identifier are ineligible in accordance with the fourth playout buffer feature. The default playout buffer duration may be defined in the first programming schedule 111.

In accordance with an embodiment, when the one or more media segments associated with the stream identifier are eligible in accordance with the fourth playout buffer feature and at least the additional parameter comprises both of a user identifier and an altered playout buffer duration flag, the one or more processors in the DACIS 103 may be further configured to query the repository of schedules, rights, and preferences database 144 based on the user identifier. In accordance with an embodiment, the one or more processors in the DACIS 103 may be further configured to receive a permissible playout buffer duration for the one or more media segments based on the query. In accordance with an embodiment, the one or more processors in the DACIS 103 may be further configured to set a playout buffer duration for the one or more media segments based on the received permissible playout buffer duration.

In accordance with an embodiment, when the one or more media segments associated with the stream identifier are eligible in accordance with the fourth playout buffer feature and at least the additional parameter comprises a desired playout buffer duration for the one or more media segments associated with the stream identifier, the one or more processors in the DACIS 103 may be further configured to set a playout buffer duration for the one or more media segments based on the desired playout buffer duration. In accordance with an embodiment, the one or more processors in the DACIS 103 may be further configured to set the playout buffer duration for the one or more media segments in accordance with the second playout buffer feature when the desired playout buffer duration exceeds a maximum playout buffer duration as defined in the first programming schedule 111.

In accordance with an embodiment, the one or more processors in the DACIS 103 may be further configured to playout the generated first disparate live media output stream. In an embodiment, the first disparate live media output stream manifest may continue the insertion of the manifest data and indexed metadata of the one or more media segments until a total number of the one or more media segments reaches the desired playout buffer duration. In another embodiment, the first disparate live media output stream manifest may maintain the playout buffer duration based on removal of the manifest data and indexed metadata of an oldest media segment for each insertion of the manifest data and indexed metadata of a new media segment when the desired playout buffer duration is reached.

In accordance with an embodiment, when the one or more media segments associated with the stream identifier are eligible for the playout and the at least the additional parameter does not comprise an altered playout buffer duration flag or a desired playout buffer duration, the one or more processors in the DACIS 103 may be further configured to set a default playout buffer duration for the one or more media segments as defined in the first programming schedule 111.

Various embodiments of the disclosure may provide a computer-readable medium, such as the non-transitory computer-readable medium 506, having stored thereon, computer implemented instruction that when executed by the processor 504 causes the media packaging and distribution system 102 to execute operations for publishing a disparate per-client live media output stream based on dynamic insertion of targeted non-programming content and customized programming content. In accordance with an embodiment, the processor 504 causes the media packaging and distribution system 102 to execute operations to receive a first manifest request, comprising one or more parameters, from a first client device, such as client device 132a. The processor 504 causes the media packaging and distribution system 102 to execute operations to determine a first additional content comprising a customized first programming content and a targeted first non-programming content for the first client device based on the one or more parameters and associated indexed metadata retrieved based on the one or more parameters. The processor 504 causes the media packaging and distribution system 102 to execute operations to generate the first programming schedule 111, for the first client device based on selected one or more live input stream and/or the one or more pre-encoded media assets, the associated indexed metadata, and the determined first additional content. The processor 504 causes the media packaging and distribution system 102 to execute operations to select one or more live input stream manifests and/or one or more pre-encoded media asset manifests published in the content delivery system 130 and associated indexed metadata based on the one or more parameters. The processor 504 causes the media packaging and distribution system 102 to execute operations to publish a first disparate live media output stream manifest for the first client device based on insertion of the selected one or more live input stream manifests and/or the one or more pre-encoded media asset manifests, the associated indexed metadata, and the determined first additional content in accordance with the first programming schedule 111, generated for the first client device.

Various embodiments of the disclosure may provide a computer-readable medium, such as the non-transitory computer-readable medium 506, having stored thereon, computer implemented instruction that when executed by the processor 504 causes the media packaging and distribution system 102 to execute operations for publishing the first programming schedule 111 that references at least one or more pre-encoded media assets and/or one or more live input streams. The published first programming schedule 111 may comprise one or more playout buffer features enabled via one or more constraints and rights. Each playout buffer feature of the one or more playout buffer features may be associated with a corresponding number of media segments that represents the one or more pre-encoded media assets and/or the one or more live input streams. In accordance with an embodiment, the processor 504 causes the media packaging and distribution system 102 to execute operations for receiving a request that comprises at least a stream identifier and at least an additional parameter. In accordance with an embodiment, the processor 504 causes the media packaging and distribution system 102 to execute operations for inserting manifest data and indexed metadata of one or more media segments associated with the stream identifier to a first disparate live media output stream manifest in accordance with a playout buffer feature from the one or more playout buffer features and at least the additional parameter. In accordance with an embodiment, the processor 504 causes the media packaging and distribution system 102 to execute operations for generating a first disparate live media output stream based on the insertion of the manifest data and indexed metadata to the first disparate live media output stream manifest.

Existing systems for SSAI support live streaming and make decisions to insert non-programming content in near real-time. However, for On-Demand streaming, such decisions to insert non-programing content are made upfront. Accordingly, amount of control the user can excerpt to influence what non-programming content is shown may get limited. Further, newer ad models are developing that rely less on interruptive video advertising and more on contextual based graphical treatment advertising within the program content. To this extent, SSAI systems have been able to circumvent ad blockers by requesting video ads on behalf of the client device and stitching them into the disparate live media output stream manifest. Typically, modern streaming protocols, that are implemented to support streaming of various live content services in such SSAI systems, require that a playout buffer for a live media output stream is definite and unchanging, so that a media player at a client device can suitably create rules, based on which media segments are fetched, buffered, and played out.

To address at least the above problems, in accordance with the various embodiments of the present disclosure, the DACIS 103 in the media packaging and distribution system 102 may be configured to include not showing non-programming content that the user elected to skip or rated poorly in an earlier non-programming content break, or could enable the user to skip all non-programming content because the user interacted with an previous non-programming content or made a purchase and the advertiser elected to sponsor the remainder of the program.

The DACIS 103 may notified about graphical treatment opportunities within the content, make the necessary ad calls on behalf of the client device, and provide the client device with the information needed to execute the overlays via a secure out-of-band channel between the DACIS 103 and the client device. In many cases, a channel already exists to support passing the program indicators, such as start and end information, to the client device and Video Player Ad-Serving Interface (VPAID) ads that cannot be stitched.

DACIS 103 may also provide an opportunity to leverage the 1:1 scale of traditional SSAI systems to support custom content choices and not just targeted advertising. For example, when a user selects to join a live stream, the CDS 105 coupled with the DACIS 103 may determine that, instead of joining the live stream for the last few minutes of a program, the user should instead be shown content more relevant to the next program. For example, showing a personalized set of basketball highlights and ads to a user who likely joined the stream to watch the basketball game that is coming on next.

Further, the DACIS 103 may be used to provide seamless failover between redundant streams for large events, thus improving reliability. While some client devices support primary and backup streams and are able to fail between them, many client devices do not. In such cases, the client device may attempt to join the alternative stream after occurrence of an event, such as a device failure or crash. For such clients, the DACIS 103 monitors both the primary and backup stream, and if there is a failure, inserts the alternative stream into the output manifest. Thus, the media packaging and distribution system 102 provides an enhanced, intelligent, and personalized viewer experience with increased appeal in order to retain and gain a wider audience.

The DACIS 103, the CDS 105, the CPDS 107, the stream publishing engine 114, PEM 115, indexing and storage system 116, the stream selection service 142, and the repository of schedules, rights, and user preferences database 144 in conjunction with each other, provide significant productivity and efficiency improvements since the process of generating disparate live media output streams with additional content is specific to each consumer device. The disparate live media output streams are simplified as the generated disparate live media output streams are independent of a requirement to re-process, that is re-encode and re-package, various live input streams for media distribution to the plurality of consumer devices in real time or near-real time. Thus, the network provider now may provide live channel offerings in a cost-effective manner.

Various components, as described above in FIG. 1B, enable the media packaging and distribution system 102 to leverage the modern streaming protocols, based on which the media packaging and distribution system 102 generates disparate live media output streams of the live broadcast channels with additional content and one or more decision points to influence the remaining disparate live media output streams. The disparate live media output streams may be generated based on insertion of live input streams into a generated disparate live media output stream using pre-encoded media assets. In this regard, manifests from the live input streams and the pre-encoded media assets may be manipulated and produced for distribution of the disparate live media output stream.

As the media content itself does not need to be processed beyond the initial creation of the live input streams and pre-encoded media assets prepared for distribution, it is extremely inexpensive to provide such disparate live media output streams and alternate disparate live media output stream (in case of stream failover). It may be based solely on the cost to manipulate the manifests, which provide the instructions for the media players in the client devices 132a, . . . , 132n to execute. The media packaging and distribution system 102 may also support targeted ad insertion and customized programming content insertion on a per client basis and may further leverage the processing power of the individual client devices 132a, . . . , 132n to insert targeted channel graphics and graphical treatment advertisements and promotions.

In accordance with the system and method for providing a dynamic playout buffer for disparate live media output stream, as proposed herein, upon the initial request, the size of the playout buffer (or the live window) may be requested by the client device or specified by the first programming schedule 111 and/or the repository of schedules, rights, and user preferences database 144. The manifest data and the indexed metadata of one or more media segments associated with the stream identifier may be determined for each unique client device, based on a combination of business rules, a playout buffer feature and at least the additional parameter, at the time of request. Accordingly, a first disparate live media output stream is tailored resulting in a dynamic playout buffer specific for that client device. Thus, the size of the playout buffer (or the live window) is unique per the client device, but potentially for the same published disparate live media output streams.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for publishing a disparate per-client live media output stream based on dynamic insertion of targeted non-programming content and customized programming content.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
   one or more processors in a media packaging and distribution system, wherein the one or more processors are configured to:
   publish a first programming schedule that references at least one or more pre-encoded media assets and/or one or more live input streams,
      wherein the published first programming schedule comprises one or more playout buffer features enabled via one or more constraints and rights, and
      wherein each playout buffer feature of the one or more playout buffer features is associated with a corresponding number of media segments that represents the one or more pre-encoded media assets and/or the one or more live input streams;
   receive a request that comprises at least a stream identifier and at least an additional parameter;
   insert manifest data and indexed metadata of one or more media segments associated with the stream identifier to a first disparate live media output stream manifest in accordance with a playout buffer feature from the one or more playout buffer features and at least the additional parameter; and
   generate a first disparate live media output stream based on the insertion of the manifest data and indexed metadata to the first disparate live media output stream manifest.

2. The system according to claim 1, wherein a first playout buffer feature of the one or more playout buffer features corresponds to a minimum playout buffer size,
   wherein the minimum playout buffer size indicates a minimum number of media segments that represents the one or more pre-encoded media assets and/or the one or more live input streams, as defined in the first programming schedule,
   wherein a second playout buffer feature of the one or more playout buffer features corresponds to a maximum playout buffer size,
   wherein the maximum playout buffer size indicates a maximum number of media segments that represents the one or more pre-encoded media assets and/or the one or more live input streams, as defined in the first programming schedule,
   wherein a third playout buffer feature of the one or more playout buffer features corresponds to a default playout buffer size,
   wherein the default playout buffer size indicates a pre-specified number of media segments that represents the one or more pre-encoded media assets and/or the one or more live input streams, as defined in the first programming schedule,
   wherein a fourth playout buffer feature of the one or more playout buffer features corresponds to an altered playout buffer size, and
   wherein the altered playout buffer size indicates an altered number of media segments that represents the one or more pre-encoded media assets and/or the one or more live input streams, as defined in the first programming schedule.

3. The system according to claim 2, wherein the one or more processors are further configured to determine the fourth playout buffer feature based on a reference to a repository of schedules, rights, and preferences database or a third-party database by the first programming schedule.

4. The system according to claim 1, wherein the request is generated by at least one of a client device or an automated service for the generation of the first disparate live media output stream.

5. The system according to claim 1, wherein the one or more processors are further configured to query an indexing and storage system based on the received request, and
   wherein the query comprises the stream identifier.

6. The system according to claim 5, wherein the one or more processors are further configured to determine the first programming schedule, the manifest data and the indexed metadata associated with the query, and
   wherein the manifest data and the indexed metadata correspond to the one or more media segments associated with the stream identifier to be inserted to the first disparate live media output stream manifest in accordance with the first programming schedule, the playout buffer feature from the one or more playout buffer features, and at least the additional parameter.

7. The system according to claim 1, wherein the one or more processors are further configured to validate that the one or more media segments associated with the stream identifier are eligible for a playout.

8. The system according to claim 7, wherein the one or more processors are further configured to generate an error notification when the one or more media segments associated with the stream identifier are ineligible for the playout.

9. The system according to claim 3, wherein the one or more processors are further configured to validate that the one or more media segments associated with the stream identifier are eligible in accordance with the fourth playout buffer feature enabled via the one or more constraints and rights.

10. The system according to claim 9, wherein the one or more processors are further configured to set a default playout buffer duration for the one or more media segments when the one or more media segments associated with the stream identifier are ineligible in accordance with the fourth playout buffer feature, and
wherein the default playout buffer duration is defined in the first programming schedule.

11. The system according to claim 9, wherein, when the one or more media segments associated with the stream identifier are eligible in accordance with the fourth playout buffer feature and at least the additional parameter comprises both of a user identifier and an altered playout buffer duration flag, the one or more processors are further configured to query the repository of schedules, rights, and preferences database based on the user identifier.

12. The system according to claim 11, wherein the one or more processors are further configured to receive a permissible playout buffer duration for the one or more media segments based on the query.

13. The system according to claim 12, wherein the one or more processors are further configured to set a playout buffer duration for the one or more media segments based on the received permissible playout buffer duration.

14. The system according to claim 9, wherein, when the one or more media segments associated with the stream identifier are eligible in accordance with the fourth playout buffer feature and at least the additional parameter comprises a desired playout buffer duration for the one or more media segments associated with the stream identifier, the one or more processors are further configured to set a playout buffer duration for the one or more media segments based on the desired playout buffer duration.

15. The system according to claim 14, wherein the one or more processors are further configured to set the playout buffer duration for the one or more media segments in accordance with the second playout buffer feature when the desired playout buffer duration exceeds a maximum playout buffer duration as defined in the first programming schedule.

16. The system according to claim 14, wherein the one or more processors are further configured to playout the generated first disparate live media output stream, and
wherein the first disparate live media output stream manifest continues the insertion of the manifest data and indexed metadata of the one or more media segments until a total number of the one or more media segments reaches the desired playout buffer duration.

17. The system according to claim 14, wherein the one or more processors are further configured to playout the generated first disparate live media output stream, and
wherein the first disparate live media output stream manifest maintains the playout buffer duration based on removal of the manifest data and indexed metadata of an oldest media segment for each insertion of the manifest data and indexed metadata of a new media segment when the desired playout buffer duration is reached.

18. The system according to claim 7, wherein, when the one or more media segments associated with the stream identifier are eligible for the playout and the at least the additional parameter does not comprise an altered playout buffer duration flag or a desired playout buffer duration, the one or more processors are further configured to set a default playout buffer duration for the one or more media segments as defined in the first programming schedule.

19. A method, comprising:
by one or more processors:
publishing a first programming schedule that references at least one or more pre-encoded media assets and/or one or more live input streams,
wherein the published first programming schedule comprises one or more playout buffer features enabled via one or more constraints and rights, and
wherein each playout buffer feature of the one or more playout buffer features is associated with a corresponding number of media segments that represents the one or more pre-encoded media assets and/or the one or more live input streams;
receiving a request that comprises at least a stream identifier and at least an additional parameter;
inserting manifest data and indexed metadata of one or more media segments associated with the stream identifier to a first disparate live media output stream manifest in accordance with a playout buffer feature from the one or more playout buffer features and at least the additional parameter; and
generating a first disparate live media output stream based on the insertion of the manifest data and indexed metadata to the first disparate live media output stream manifest.

20. The method according to claim 19, wherein a first playout buffer feature of the one or more playout buffer features corresponds to a minimum playout buffer size,
wherein the minimum playout buffer size indicates a minimum number of media segments that represents the one or more pre-encoded media assets and/or the one or more live input streams, as defined in the first programming schedule,
wherein a second playout buffer feature of the one or more playout buffer features corresponds to a maximum playout buffer size,
wherein the maximum playout buffer size indicates a maximum number of media segments that represents the one or more pre-encoded media assets and/or the one or more live input streams, as defined in the first programming schedule,
wherein a third playout buffer feature of the one or more playout buffer features corresponds to a default playout buffer size,
wherein the default playout buffer size indicates a pre-specified number of media segments that represents the one or more pre-encoded media assets and/or the one or more live input streams, as defined in the first programming schedule,
wherein a fourth playout buffer feature of the one or more playout buffer features corresponds to an altered playout buffer size, and
wherein the altered playout buffer size indicates an altered number of media segments that represents the one or more pre-encoded media assets and/or the one or more live input streams, as defined in the first programming schedule.

21. The method according to claim 20, further comprising determining, by the one or more processors, the fourth playout buffer feature based on a reference to a repository of schedules, rights, and preferences database or a third-party database by the first programming schedule.

22. The method according to claim 19, wherein the request is generated by one of a client device or an automated service for the generation of the first disparate live media output stream.

23. The method according to claim 19, further comprising querying, by the one or more processors, an indexing and storage method based on the received request, and
    wherein the query comprises the stream identifier.

24. The method according to claim 23, further comprising determining, by the one or more processors, the first programming schedule, the manifest data and the indexed metadata associated with the query, and
    wherein the manifest data and the indexed metadata correspond to the one or more media segments associated with the stream identifier to be inserted to the first disparate live media output stream manifest in accordance with the first programming schedule, the playout buffer feature from the one or more playout buffer features, and at least the additional parameter.

25. The method according to claim 19, further comprising validating, by the one or more processors, that the one or more media segments associated with the stream identifier are eligible for a playout.

26. The method according to claim 25, further comprising generating, by the one or more processors, an error notification when the one or more media segments associated with the stream identifier are ineligible for the playout.

27. The method according to claim 20, further comprising validating, by the one or more processors, that the one or more media segments associated with the stream identifier are eligible in accordance with the fourth playout buffer feature enabled via the one or more constraints and rights.

28. The method according to claim 26, further comprising setting, by the one or more processors, a default playout buffer duration for the one or more media segments when the one or more media segments associated with the stream identifier are ineligible in accordance with a fourth playout buffer feature, and
    wherein the default playout buffer duration is defined in the first programming schedule.

29. The method according to claim 26, further comprising querying, by the one or more processors, a repository of schedules, rights, and preferences database based on a user identifier, when the one or more media segments associated with the stream identifier are eligible in accordance with a fourth playout buffer feature and at least the additional parameter comprises both of the user identifier and an altered playout buffer duration flag.

30. The method according to claim 29, further comprising receiving, by the one or more processors, a permissible playout buffer duration for the one or more media segments based on the query.

31. The method according to claim 30, further comprising setting, by the one or more processors, a playout buffer duration for the one or more media segments based on the received permissible playout buffer duration.

32. The method according to claim 27, further comprising setting, by the one or more processors, a playout buffer duration for the one or more media segments based on a desired playout buffer duration, when the one or more media segments associated with the stream identifier are eligible in accordance with the fourth playout buffer feature and at least the additional parameter comprises the desired playout buffer duration for the one or more media segments associated with the stream identifier.

33. The method according to claim 32, further comprising setting, by the one or more processors, the playout buffer duration for the one or more media segments in accordance with the second playout buffer feature when the desired playout buffer duration exceeds a maximum playout buffer duration as defined in the first programming schedule.

34. The method according to claim 32, further comprising playing out, by the one or more processors, the generated first disparate live media output stream, and
    wherein the first disparate live media output stream manifest continues the insertion of the manifest data and indexed metadata of the one or more media segments until a total number of the one or more media segments reaches the desired playout buffer duration.

35. The method according to claim 32, further comprising playing out, by the one or more processors, the generated first disparate live media output stream, and
    wherein the first disparate live media output stream manifest maintains the playout buffer duration based on removal of the manifest data and indexed metadata of an oldest media segment for each insertion of the manifest data and indexed metadata of a new media segment when the desired playout buffer duration is reached.

36. The method according to claim 25, further comprising setting, by the one or more processors, a default playout buffer duration for the one or more media segments as defined in the first programming schedule, when the one or more media segments associated with the stream identifier are eligible for the playout and the at least the additional parameter does not comprise an altered playout buffer duration flag or a desired playout buffer duration.

37. A non-transitory computer-readable medium having stored thereon, computer implemented instruction that when executed by a processor in a computer, causes the computer to execute operations, the operations comprising:
    publishing a first programming schedule that references at least one or more pre-encoded media assets and/or one or more live input streams,
        wherein the published first programming schedule comprises one or more playout buffer features enabled via one or more constraints and rights, and
        wherein each playout buffer feature of the one or more playout buffer features is associated with a corresponding number of media segments that represents the one or more pre-encoded media assets and/or the one or more live input streams;
    receiving a request that comprises at least a stream identifier and at least an additional parameter;
    inserting manifest data and indexed metadata of one or more media segments associated with the stream identifier to a first disparate live media output stream manifest in accordance with a playout buffer feature from the one or more playout buffer features and at least the additional parameter; and
    generating a first disparate live media output stream based on the insertion of the manifest data and indexed metadata to the first disparate live media output stream manifest.

* * * * *